(12) United States Patent
Abe et al.

(10) Patent No.: US 12,352,012 B2
(45) Date of Patent: Jul. 8, 2025

(54) WORKING MACHINE

(71) Applicant: KUBOTA CORPORATION, Osaka (JP)

(72) Inventors: Daiki Abe, Osaka (JP); Yuya Tanabe, Osaka (JP); Hiroaki Nakagawa, Osaka (JP); Ryota Hamamoto, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 1007 days.

(21) Appl. No.: 17/396,195

(22) Filed: Aug. 6, 2021

(65) Prior Publication Data

US 2022/0049470 A1    Feb. 17, 2022

(30) Foreign Application Priority Data

Aug. 15, 2020  (JP) ................. 2020-137184
Aug. 15, 2020  (JP) ................. 2020-137185
Aug. 15, 2020  (JP) ................. 2020-137186

(51) Int. Cl.
| | | |
|---|---|---|
| E02F 9/22 | (2006.01) | |
| E02F 9/20 | (2006.01) | |
| F16H 59/36 | (2006.01) | |
| F16H 59/46 | (2006.01) | |
| F16H 61/4008 | (2010.01) | |

(52) U.S. Cl.
CPC .......... *E02F 9/2253* (2013.01); *E02F 9/2004* (2013.01); *E02F 9/2285* (2013.01); *F16H 59/46* (2013.01); *F16H 61/4008* (2013.01); *E02F 9/2292* (2013.01); *E02F 9/2296* (2013.01); *F16H 2059/366* (2013.01)

(58) Field of Classification Search
CPC ...... E02F 9/2253; E02F 9/2285; F16H 59/46; F16H 61/456; F16H 2059/366
See application file for complete search history.

(56) References Cited

FOREIGN PATENT DOCUMENTS

JP        2013-036274 A        2/2013

*Primary Examiner* — Nathaniel E Wiehe
*Assistant Examiner* — Daniel S Collins
(74) *Attorney, Agent, or Firm* — Greenblum & Bernstein, P.L.C.

(57) ABSTRACT

A working machine includes a prime mover, a traveling pump driven by power of the prime mover to deliver hydraulic fluid, a traveling motor rotated by the hydraulic fluid delivered from the traveling pump, an operation valve configured to change a pilot pressure of pilot fluid output therefrom to the traveling pump according to operation of an operation member, an actuation valve to be activated according to a control signal so as to change a primary pressure supplied to the operation valve, a controller to perform setting of the control signal to be output to the actuation valve, and a pressure detection device to detect a secondary pressure output from the operation valve. The controller includes a setting change unit to change, based on the primary pressure and the secondary pressure, the setting of the control signal to be output to the actuation valve.

20 Claims, 18 Drawing Sheets

WORKING MACHINE

BACKGROUND OF THE INVENTION

1. Field of the Invention

The present invention relates to a working machine such as a skid steer loader or a compact track loader.

2. Description of the Related Art

A technique disclosed in Japanese Unexamined Patent Publication No. 2013-36274 is known as a technique to prevent the engine stalling in a working machine such as a skid steer loader or a compact track loader.

The working machine disclosed in Japanese Unexamined Patent Publication No. 2013-36274 includes an engine, an HST pump to be driven by a power of the engine, a traveling operation device to operate the HST pump, a pressure control valve to control a traveling primary pressure, which is a pressure on a primary side of the traveling operation device, and a controller to control the pressure control valve.

The controller performs an anti-stall control to prevent the engine from stalling. In the anti-stall control, the controller prevents the engine stalling by controlling the pressure control valve based on a no-load characteristic line adopted when no load is acting on the engine and a drop characteristic line adopted when a predetermined or greater load is acting on the engine. In other words, the pressure control valve is controlled to rapidly drop the traveling primary pressure when a traveling load not less than a predetermined level is acting on the working machine, thereby minimizing the drop in engine speed as much as possible to prevent the engine stalling.

SUMMARY OF THE INVENTION

In the working machine disclosed in the above-mentioned Japanese Unexamined Patent Publication No. 2013-36274, when an engine speed is in a middle speed range, an output of the pressure control valve is lowered to secure a climbing speed, thereby suppressing excessive engine-speed dropping and keeping an appropriate engine speed (middle speed range) to keep a vehicle speed.

However, when a response of the anti-stall control (tracking of an actual pressure of the pressure control valve relative to a target pressure) is poor, the work efficiency of the working machine is reduced due to the engine-speed dropping larger than that of expectation, or the flowrate of the HST pump is reduced when recovering from the engine-speed dropping, which may give an operator a feeling as if a traveling force of the working machine is reduced.

Moreover, when the engine speed is in a high speed range, an output of the pressure control valve must be set high to prevent the phenomenon in which a high engine speed remains (the phenomenon where an output horsepower of the engine exceeds a consumption horsepower of the HST pump and the engine speed scarcely drops). In the phenomenon in which the high engine speed remains, it may give an operator a feeling that the working machine is not doing enough work (the machine saves the horsepower against an operation by an operator).

To solve the above problem, it is necessary to reduce an output of the pressure control valve when the engine speed is in the middle speed range and increase the output of the pressure control valve when the engine speed is in the high speed range. However, when the difference between the output of the pressure control valve at the engine speed in the middle speed range and the output of the pressure control valve at the engine speed in the high speed range is made extremely large (a slope of the output of the pressure control valve is set too steeply relative to the engine speed), hunting in the engine speed may occur in the control.

After setting the output of the pressure control valve according to the case where the engine speed is in the middle speed range to prioritize a hill climbing speed, it is possible to set the output of the pressure control valve according to the case where the engine speed is in the high speed range within a range where the hunting does not occur. In this case, the phenomenon in which a high engine speed remains can be prevented, but a traveling power in the high speed range tends to be reduced. In particular, in a work involving an operation to open a traveling relief valve, such as soil pushing, a delivery flowrate of the HST pump (horsepower consumed by the HST pump) is reduced due to an effect of swash plate characteristics of the HST pump, and the balanced engine speed becomes high, it may give an operator a feeling that the working machine is not doing enough work.

A working machine capable of preventing reduction of work efficiency due to excessive engine-speed dropping and of preventing giving an operator a feeling as if a traveling force is reduced in recovery from the engine-speed dropping is desired.

In addition, a working machine capable of preventing a traveling force from being reduced at a high speed range while preventing a phenomenon in which an engine speed is remained high, thereby giving an operator a feeling as if the working machine is doing enough work is desired.

Technical means for solving this technical problem is characterized by the following points.

In an aspect, a working machine includes a prime mover, a traveling pump configured to be driven by power of the prime mover so as to deliver hydraulic fluid, a traveling motor configured to be rotated by the hydraulic fluid delivered from the traveling pump, an operation valve configured to change a pilot pressure of pilot fluid output therefrom to the traveling pump according to operation of an operation member, an actuation valve configured to be activated according to a control signal so as to change a primary pressure that is the pilot pressure of the pilot fluid to be supplied to the operation valve, a controller configured or programmed to perform setting of the control signal to be output to the actuation valve, and a pressure detection device configured to detect a secondary pressure that is the pilot pressure output from the operation valve. The controller includes a setting change unit configured or programmed to change, based on the primary pressure and the secondary pressure, the setting of the control signal to be output to the actuation valve.

The controller includes a calculation unit configured or programmed to calculate a differential pressure between a target pressure of the primary pressure determined in correspondence to the control signal and the secondary pressure.

The controller includes a storage unit configured or programmed to store a correlation between the control signal and the target pressure. When the control signal is output to the actuation valve, the calculation unit is configured or programmed to use the storage unit so as to refer to the target pressure corresponding to the output control signal, and to calculate the differential pressure between the referred-to target pressure and the secondary pressure.

The working machine includes an accelerator operable to set a target rotation speed of the prime mover, and a rotation speed detection device configured to detect an actual rotation speed of the prime mover. The storage unit is configured or programmed to store a first line that represents the control signal corresponding to the target pressure to be set based to the actual rotation speed when a difference between the target rotation speed and the actual rotation speed is not smaller than a first threshold and the differential pressure is not larger than a second threshold, and to store a second line that represents the control signal corresponding to the target pressure to be set based on the actual rotation speed when the difference between the target rotation speed and the actual rotation speed is smaller than the first threshold. The setting change unit is configured or programmed to change, when the differential pressure becomes larger than the second threshold, the control signal represented by the first line so as to shift the first line.

The setting change unit is configured or programmed to finish, when the differential pressure becomes not larger than a third threshold that is smaller than the second threshold, the shifting of the first line.

The setting change unit is configured or programmed to gradually restore, when the shifting of the first line is finished, the control signal to a value before the shifting of the first line.

The actuation valve is a solenoid proportional valve configured to increase an opening degree thereof in proportion to a magnitude of current value. The setting change unit is configured or programmed to shift the first line in a direction such as to reduce the primary pressure output from the actuation valve when the differential pressure is larger than the second threshold and the secondary pressure is larger than the target pressure, and to shift the first line in a direction such as to increase the primary pressure output from the actuation valve when the differential pressure is larger than the second threshold and the secondary pressure is less than the target pressure.

The setting change unit changes a setting of the control signal output to the actuation valve based on a correction coefficient set corresponding to a value of the differential pressure.

The storage unit stores a function defining a relationship between the differential pressure and the correction coefficient. The setting change unit calculates the correction coefficient by substituting the differential pressure calculated by the calculation unit into the function.

The working machine includes a first fluid passage connecting the operation valve to the actuation valve, and a second fluid passage connecting the operation valve to the traveling pump, and the pressure detection device detects, as the secondary pressure, a pilot pressure in the second fluid passage.

In addition, a working machine according to another aspect of the present invention, includes a prime mover, a traveling pump configured to be driven by power of the prime mover so as to deliver hydraulic fluid, a traveling motor configured to be rotated by the hydraulic fluid delivered from the traveling pump, an operation valve configured to change a pilot pressure of pilot fluid output therefrom to the traveling pump according to operation of an operation member, an actuation valve configured to be activated according to a control signal so as to change a primary pressure that is the pilot pressure of the pilot fluid to be supplied to the operation valve, a rotation speed detection device configured to detect an actual rotation speed of the prime mover, and a controller configured or programmed to perform setting of the control signal to be output to the actuation valve. The controller includes a calculation unit configured or programmed to calculate a derivative representing a rate of change of the actual rotation speed per unit time, and a setting change unit configured or programmed to change, based on the derivative calculated by the calculation unit, the setting of the control signal to be output to the actuation valve.

In addition, the working machine includes an accelerator operable to set a target rotation speed of the prime mover, and a storage unit configured or programmed to store a first line that represents the control signal to be set based to the actual rotation speed when a difference between the target rotation speed and the actual rotation speed is not smaller than a first threshold, and to store a second line that represents the control signal larger than that represented by the first line when the difference between the target rotation speed and the actual rotation speed is smaller than the first threshold. The setting change unit is configured or programmed to change, based on the derivative, the control signal represented by the first line so as to shift the first line.

In addition, the setting change unit is configured or programmed to shift the first line based on a correlation between the derivative and the second threshold.

In addition, the actuation valve is a proportional solenoid valve having an opening degree increased in proportion to increase of an electric current value. The setting change unit is configured or programmed to shift, when the derivative is larger in a positive direction than the second threshold, the first line in a direction such as to reduce the primary pressure output from the actuation valve.

In addition, the setting change unit is configured or programmed to finish, when the derivative becomes not larger than the third threshold that is smaller than the second threshold, the shifting of the first line.

In addition, the setting change unit changes the setting of the control signal output to the actuation valve based on the correction coefficient set corresponding to a value of the derivative.

In addition, the storage unit stores a function defining a relationship between the derivative and the correction coefficient. The setting change unit calculates the correction coefficient by substituting the derivative calculated by the calculation unit into the function.

In addition, a working machine according to further another aspect, includes a prime mover, a traveling pump configured to be driven by power of the prime mover so as to deliver hydraulic fluid, a traveling motor configured to be rotated by the hydraulic fluid delivered from the traveling pump, an operation valve configured to change a pilot pressure of pilot fluid output therefrom to the traveling pump according to operation of an operation member, an actuation valve configured to be activated according to a control signal so as to change a primary pressure that is the pilot pressure of the pilot fluid to be supplied to the operation valve, a controller configured and programmed to perform setting of the control signal to be output to the actuation valve, a circulation fluid passage fluidly connecting the traveling pump to the traveling motor, and a pressure detection device configured to detect a traveling pressure that is a pressure of the hydraulic fluid in the circulation fluid passage. The controller includes a setting change unit configured or programmed to change, based on the traveling pressure, the setting of the control signal to be output to the actuation valve.

In addition, the working machine includes an accelerator operable to set a target rotation speed of the prime mover, a rotation speed detection device configured to detect an actual rotation speed of the prime mover, and a storage unit configured or programmed to store a first line that represents the control signal to be set based to the actual rotation speed when a difference between the target rotation speed and the actual rotation speed is not smaller than a first threshold, and to store a second line that represents the control signal larger than that represented by the first line when the difference between the target rotation speed and the actual rotation speed is smaller than the first threshold. The setting change unit is configured or programmed to change, based on the traveling pressure, the control signal represented by the first line so as to shift the first line.

In addition, the actuation valve is a proportional solenoid valve having an opening degree increased in proportion to increase of an electric current value. The setting change unit is configured or programmed to shift, when the traveling pressure becomes not smaller than the second threshold, the first line in a direction such as to increase the primary pressure output from the actuation valve.

In addition, the actuation valve is a proportional solenoid valve having an opening degree increased in proportion to increase of an electric current value. The setting change unit is configured or programmed to shift, when the traveling pressure becomes not smaller than the second threshold, the first line in a such as to reduce the primary pressure output from the actuation valve.

The setting change unit is configured or programmed to finish, when the traveling pressure becomes not larger than the third threshold that is smaller than the second threshold, the shifting of the first line.

In addition, the setting change unit changes the setting of the control signal output to the actuation valve based on the correction coefficient set corresponding to a value of the traveling pressure.

In addition, the storage unit stores a function defining a relationship between the traveling pressure and the correction coefficient. The setting change unit calculates the correction coefficient by substituting the traveling pressure detected by the pressure detection device into the function.

According to the present invention, a deterioration in work efficiency due to excessive engine-speed dropping and a feeling of driving-force reduction in recovering from engine-speed dropping can be prevented.

In addition, according to the present invention, dropping of a traveling force in a high speed range can be prevented while preventing the phenomenon in which an engine speed is remained high, thereby giving an operator a feeling as if the working machine is doing enough work.

DETAILED DESCRIPTION OF THE PREFERRED EMBODIMENTS

A preferred embodiment of a working machine will be described below with reference to drawings.

First Embodiment

Figure 18:
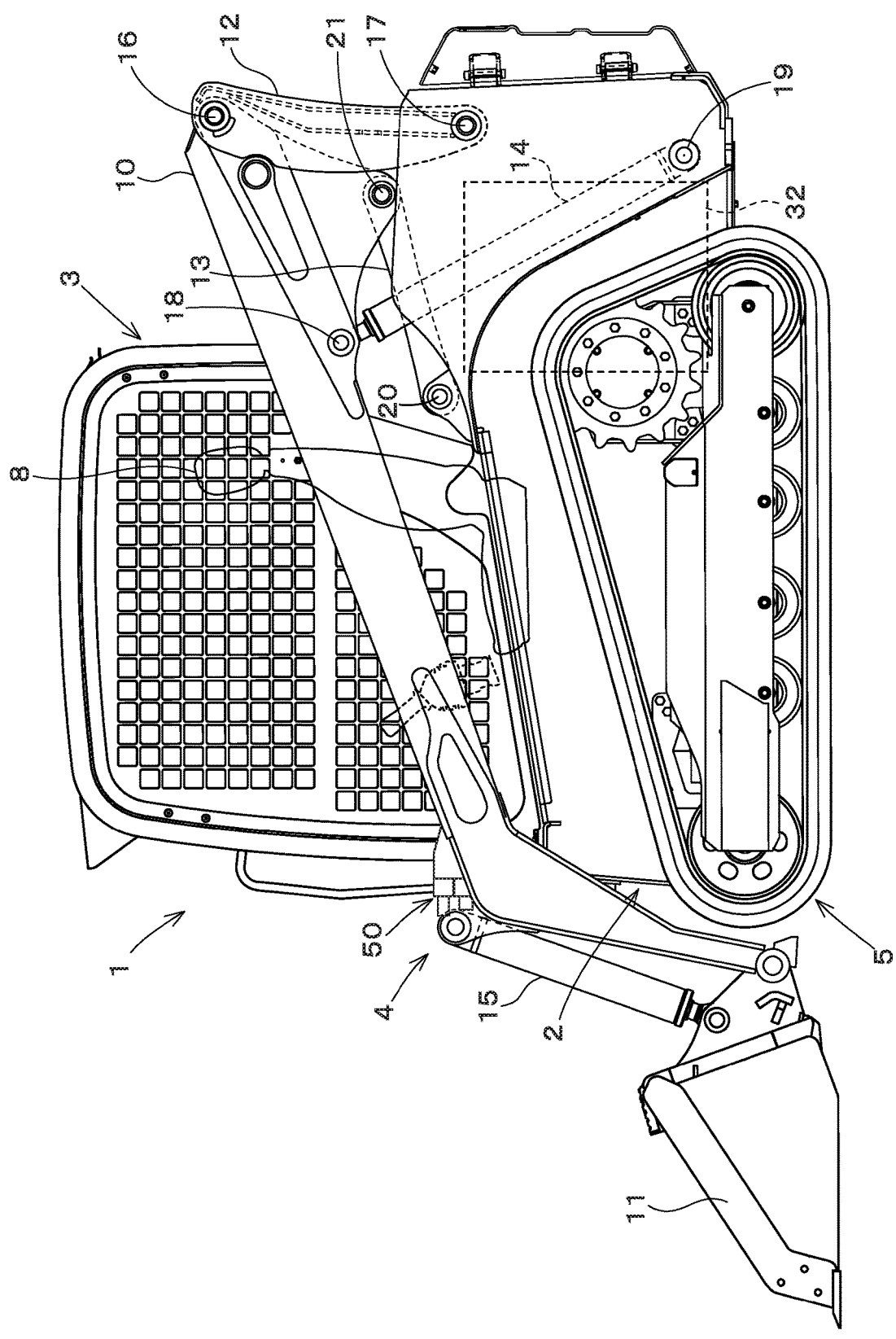
FIG. 18 is a side view showing a track loader that is an example of the working machine.

FIG. 18 is a side view of a working machine according to an embodiment of the present invention. FIG. 18 shows a compact track loader as an example of the working machine. However, the working machine according to the embodiment of the present invention is not limited to the compact track loader. The working machine may be another typed loader, such as a skid steer loader. The working machine may be any other than loaders.

As shown in FIG. 18, the working machine 1 is provided with a machine body 2, a cabin 3, a working device 4, and traveling devices 5. In the embodiment of the present invention, a forward direction from an operator siting on an operator's seat 8 of the working machine 1 (a left side in FIG. 18) is referred to as the front, a rearward direction from the driver (a right side in FIG. 18) is referred to as the rear, a leftward direction from the driver (a front surface side of FIG. 18) is referred to as the left, and a rightward direction from the driver (a back surface side of FIG. 18) is referred to as the right. In addition, a horizontal direction orthogonal to a fore-and-aft direction is referred to as a machine width direction.

The cabin 3 is mounted on the machine body 2. The cabin 3 incorporates a driver seat 8. The working device 4 is attached to the machine body 2. A prime mover 32 is mounted inside a rear portion of the machine body 2. The traveling devices 5 are arranged on the outside of the machine body 2. The traveling devices 5 include a first traveling device 5L provided on a left portion of the machine body 2 and a second traveling device 5R provided on a right portion of the machine body 2.

The working device 4 includes booms 10, a working tool 11, lift links 12, control links 13, boom cylinders 14, and bucket cylinders 15.

The booms 10 are arranged on right and left sides of the cabin 3 swingably up and down. The working tool 11 is a bucket, for example. The bucket 11 is arranged on tip portions (that is, front end portions) of the booms 10 swingably up and down. The lift links 12 and the control links 13 support base portions (that is, rear portions) of the booms 10 so that the booms 10 can be swung up and down. The boom cylinders 14 are extended and contracted to lift and lower the booms 10. The bucket cylinders 15 are extended and contracted to swing the bucket 11.

Front portions of the right and left booms 10 are connected to each other by a deformed connecting pipe. Base portions (that is, rear portions) of the booms 10 are connected to each other by a circular connecting pipe.

The lift links 12, control links 13, and boom cylinders 14 are arranged on right and left sides of the machine body 2 to correspond to the right and left booms 10.

The lift links 12 are extended vertically from rear portions of the base portions of the booms 10. Upper portions (one ends) of the lift links 12 are pivotally supported on the rear portion of the base portions of the booms 10 via respective pivot shafts 16 (pivot shafts) rotatably around their lateral axes. In addition, lower portions (the other ends) of the lift links 12 are pivotally supported on a rear portion of the machine body 2 via respective pivot shafts 17 (pivot shafts) rotatably around their lateral axes. The pivot shafts 17 are provided below the pivot shafts 16.

Upper portions of the boom cylinders 14 are pivotally supported via respective pivot shafts 18 (pivot shafts) rotatably around their lateral axes. The pivot shafts 18 are provided at the base portions of the booms 10, especially, at front portions of the base portions. Lower portions of the boom cylinders 14 are pivotally supported on respective pivot shafts 19 (pivot shafts) rotatably around their lateral axes. The fourth pivot shafts 19 are provided closer to a lower portion of the rear portion of the machine body 2 and below the pivot shafts 18.

The control links 13 are provided in front of the lift links 12. One ends of the control links 13 are pivotally supported via respective pivot shafts 20 (pivot shafts) rotatably around their lateral axes. The pivot shafts 20 are provided on the machine body 2 forward of the lift links 12. The other ends of the control links 13 are pivotally supported via respective pivot shafts 21 (pivot shafts) rotatably around their lateral axes. The pivot shafts 21 are provided on the booms 10 forwardly upward from the second pivot shafts 17.

By extending and contracting the boom cylinders 14, the booms 10 are swung up and down around the pivot shafts 16 with the base portions of the booms 10 supported by the lift links 12 and the control links 13, thereby lifting and lowering the tip end portions of the booms 10. The control links 13 are swung up and down around the pivot shafts 20 by the vertical swinging of the booms 10. The lift links 12 are swung back and forth around the pivot shafts 17 by the vertical swinging of the control links 13.

An alternative working tool instead of the bucket 11 can be attached to the front portions of the booms 10. The other working tool is, for example, an attachment (that is, an auxiliary attachment) such as a hydraulic crusher, a hydraulic breaker, an angle broom, an earth auger, a pallet fork, a sweeper, a mower or a snow blower.

A connecting member 50 is provided at the front portion of the left boom 10. The connecting member 50 is a device configured to connect a hydraulic equipment attached to the auxiliary attachment to a first piping member such as a pipe provided on the left boom 10. Specifically, the first piping member can be connected to one end of the connecting member 50, and a second piping member connected to the hydraulic equipment of the auxiliary attachment can be connected to the other end. In this manner, a hydraulic fluid flowing in the first piping member passes through the second piping member and is supplied to the hydraulic equipment.

The bucket cylinders 15 are arranged close to the front portions of the booms 10, respectively. The bucket cylinders 15 are extended and contracted to swing the bucket 11.

In this embodiment, each of the traveling devices 5 (first traveling device 5L and second traveling device 5R) disposed on the left and right portions is a crawler type (including semi-crawler type) traveling device. Alternatively, a wheel-type traveling device having front wheels and rear wheels may be adopted.

An engine (specifically, an internal combustion engine), such as a diesel engine or a gasoline engine, an electric motor, or the like may serve as the prime mover 32. In the embodiment, the prime mover 32 is the diesel engine, but is not limited thereto.

Next, the hydraulic system for the working machine 1 will be described.

Figure 1:
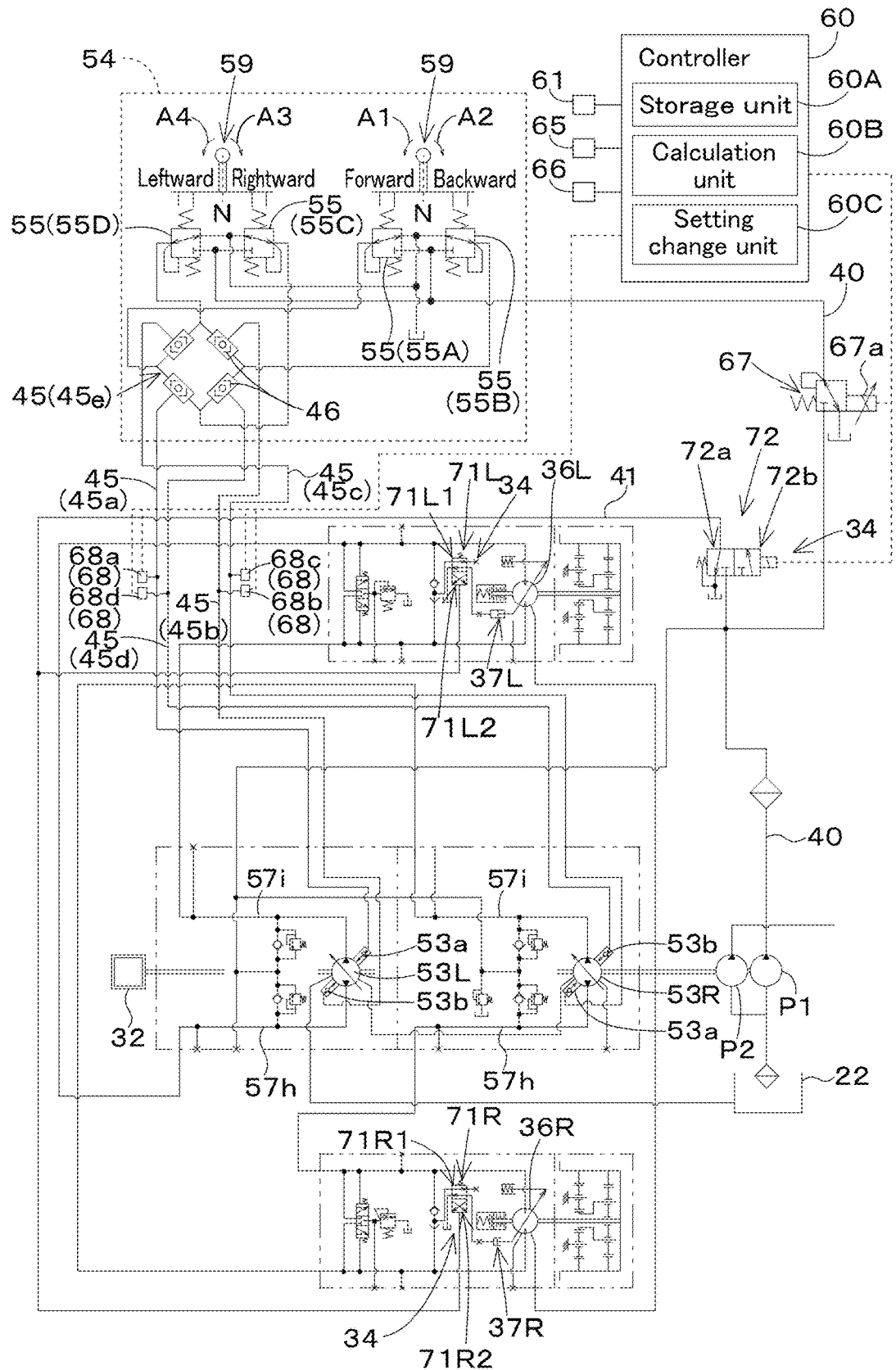
FIG. 1 is a view showing a hydraulic system (hydraulic circuit) for a working machine according to a first embodiment.

The hydraulic system for the working machine 1 shown in FIG. 1 is configured to drive the traveling devices 5. The hydraulic system for the working machine 1 has the first traveling pump 53L, the second traveling pump 53R, the first traveling motor 36L, and the second traveling motor 36R.

The first traveling pump 53L and the second traveling pump 53R are pumps to be driven by the power of prime mover 32. Specifically, each of the first traveling pump 53L and the second traveling pump 53R is a variable displacement axial pump with a swash plate and is driven by the power of prime mover 32. Each of the first traveling pump 53L and the second traveling pump 53R includes a forward-traveling pressure-receiving portion 53a and a backward-traveling pressure-receiving portion 53b to which pilot pressures are applied. Angles of the swash plates are changed by the pilot pressures applied to the pressure-receiving portions 53a and 53b. In each of the first and second traveling pumps 53L and 53R, by changing the angle of the swash plate, delivery (output) amount and direction of hydraulic fluid can be changed.

The first traveling pump 53L and the first traveling motor 36L are connected by a circulation fluid passage 57h, and hydraulic fluid delivered from the first traveling pump 53L is supplied to the first traveling motor 36L. The second traveling pump 53R and the second traveling motor 36R are connected by a circulation fluid passage 57i, and the hydraulic fluid delivered from the second traveling pump 53R is supplied to the second traveling motor 36R.

The first traveling motor 36L is a motor configured to transmit a power to a drive shaft of the first traveling device 5L provided on the left portion of the machine body 2. The first traveling motor 36L is capable of being rotated by hydraulic fluid delivered from the first traveling pump 53L. The rotation speed (number of rotations) of the first traveling motor 36L can be changed by changing a flowrate of hydraulic fluid to be supplied. A swash plate switching cylinder 37L is connected to the first traveling motor 36L. By extending and contracting the swash plate switching cylinder 37L in one direction or the other direction, a rotation speed (number of rotations) of the first traveling motor 36L can be changed. That is, when the swash plate switching cylinder 37L is contracted, the rotation speed of the first traveling motor 36L is set to a lower first speed (a predetermined low-speed range). When the swash plate switching cylinder 37L is extended, a rotation speed of the first traveling motor 36L is set to a higher second speed (a predetermined high-speed range). That is, a rotation speed of the first traveling motor 36L can be changed between the first speed and the second speed.

The second traveling motor 36R is a motor configured to transmit a power to a drive shaft of the second traveling device 5R provided on the right portion of the machine body 2. The second traveling motor 36R is capable of being rotated by hydraulic fluid delivered from the second traveling pump 53R. The rotation speed (number of rotations) of the second traveling motor 36R can be changed by changing a flowrate of hydraulic fluid to be supplied. A swash plate switching cylinder 37R is connected to the second traveling motor 36R. By extending and contracting the swash plate switching cylinder 37R in one direction or the other direction, a rotation speed (number of rotations) of the second traveling motor 36R can be changed. That is, when the swash plate switching cylinder 37R is contracted, the rotation speed of the first traveling motor 36R is set to a lower first speed (predetermined low-speed range). When the swash plate switching cylinder 37R is extended, a rotation speed of the first traveling motor 36R is set to a higher second speed (a predetermined high-speed range). That is, a rotation speed of the second traveling motor 36R can be changed between the first speed and the second speed.

As shown in FIG. 1, the hydraulic system for the working device has a traveling switching valve 34. The traveling switching valve 34 is configured to be set at either a position (referred to as a first state) for shifting the rotation speed of each of the traveling motors (that is, the traveling motor 36L and the traveling motor 36R) to the first speed or a position (referred to as a second state) for shifting the rotation speed of each traveling motor to the second speed. The traveling switching valve 34 includes first switching valves 71L and 71R and a second switching valve 72.

The first switching valve 71L is constituted of a two-position switching valve connected via a fluid passage to the swash plate switching cylinder 37L of the first traveling motor 36L, and has two positions, a first position 71L1 and a second position 71L2. The first switching valve 71L contracts the swash plate switching cylinder 37L when it is set at the first position 71L1, and extends the swash plate switching cylinder 37L when it is set at the second position 71L2.

The first switching valve 71R is constituted of a two-position switching valve connected via a fluid passage to the swash plate switching cylinder 37R of the second traveling motor 36R, and has two positions, a first position 71R1 and a second position 71R2. The first switching valve 71R contracts the swash plate switching cylinder 37R when it is set at the first position 71R1, and extends the swash plate switching cylinder 37R when it is set at the second position 71R2.

The second switching valve 72 is a solenoid valve that switches the first switching valve 71L and the first switching valve 71R, and is constituted of a two-position switching valve having two positions, a first position 72a and a second position 72b. The second switching valve 72, the first switching valve 71L, and the first switching valve 71R are connected by a fluid passage 41. The second switching valve 72 switches the first switching valve 71L and the first switching valve 71R respectively to the first positions 71L1 and 71R1 when switched to the first position 72a, and switches the first switching valve 71L and the first switching valve 71R respectively to the second positions 71L2 and 71R2 when switched to the second position 72b.

That is, the traveling switching valve 34 is set in the first state to shift the rotation speed of each of the two traveling motors (first traveling motor 36L and second traveling motor 36R) to the first speed when the second switching valve 72 is set at the first position 72a, the first switching valve 71L is set at the first position 71L1, and the first switching valve 71R is set at the first position 71R1. The traveling switching valve 34 is set in the second state to shift the rotation speed of each of the two traveling motors (first traveling motor 36L and second traveling motor 36R) to the second speed when the second switching valve 72 is set at the second position 72b, the first switching valve 71L is set at the second position 71L2, and the first switching valve 71R is set at the second position 71R2.

Accordingly, the traveling switching valve 34 allows the two traveling motors (first traveling motor 36L and second traveling motor 36R) to be switched between the first speed and the second speed.

The hydraulic system for the working machine includes a first hydraulic pump P1, a second hydraulic pump P2, and an operation device 54. The first hydraulic pump P1 is a constant displacement gear pump driven by power of the prime mover 32. The first hydraulic pump P1 is configured to supply hydraulic fluid stored in the tank 22. In particular, the first hydraulic pump P1 supplies hydraulic fluid that is mainly used for control. For convenience of explanation, the tank 22 storing hydraulic fluid may be referred to as a hydraulic fluid tank. Of the hydraulic fluid supplied from the first hydraulic pump P1, the hydraulic fluid used for control is referred to as a pilot fluid, and a pressure of the pilot fluid is referred to as a pilot pressure.

The second hydraulic pump P2 is a constant displacement gear pump driven by power of the prime mover 32. The second hydraulic pump P2 is configured to supply hydraulic fluid stored in the tank 22, and for example, supplies the hydraulic fluid to a fluid passage of the working system. The second hydraulic pump P2 supplies hydraulic fluid, for example, to the boom cylinders 14 that operate the booms 10, the bucket cylinders 15 that operate the bucket, and the control valves (that is, flow control valves) that control and operate an auxiliary hydraulic actuator.

The operation device 54 is configured to operate the two traveling pumps (first traveling pump 53L and the second traveling pump 53R), and is capable of changing the angles of swash plates (swash plate angles) of the traveling pumps. The operation device 54 includes the operation member 59 and a plurality of operation valves 55.

An operation lever 59 serving as the operation member 59 is supported on the operation valves 55 and is operable to swing in a lateral direction (the machine width direction) or the fore-and-aft direction. The operation member 59 is operable to the right and to the left from a neutral position N, and operable to the front and to the rear from the neutral position N. In other words, the operation lever 59 is swingable in at least four directions from the neutral position N. For convenience of explanation, the forward and backward directions, that is, the fore-and-aft direction, may be referred to as a first direction. In addition, the rightward and leftward directions, that is, the lateral direction (that is, the machine width direction), may be referred to as a second direction.

In addition, the plurality of operation valves 55 are operated by the common, i.e., single, operation lever 59. The plurality of operation valves 55 are actuated based on swinging of the operation lever 59. A delivery fluid passage 40 is connected to the plurality of operation valves 55, and hydraulic fluid (pilot fluid) from the first hydraulic pump P1 can be delivered through the delivery fluid passage 40. The delivery fluid passage 40 is a fluid passage that connects the operation valves 55 to the actuation valve 67. Hereafter, the delivery fluid passage 40 may be referred to as a first fluid passage 40.

The plurality of operation valves 55 include an operation valve 55A, an operation valve 55B, an operation valve 55C, and an operation valve 55D. When the operation lever 59 is swung forward (in one direction) in the fore-and-aft direction (first direction) (that is, when a forward operation is performed), the operation valve 55A changes a pressure of hydraulic fluid to be output according to an operation amount (performance) of the forward operation. When the operation lever 59 is swung backward (in the other direction) in the fore-and-aft direction (first direction) (that is, when a backward operation is performed), the operation valve 55B changes a pressure of hydraulic fluid to be output according to an operation amount (performance) of the backward operation. When the operation lever 59 is swung rightward (in one direction) in the lateral direction (second direction) (that is, when a rightward operation is performed), the operation valve 55C changes a pressure of hydraulic fluid to be output according to an operation amount (performance) of the rightward operation. When the operation lever 59 is swung leftward (in the other direction) in the lateral direction (second direction) (that is, when a leftward operation is performed), the operation valve 55D changes a pressure of hydraulic fluid to be output according to an operation amount (performance) of the leftward operation.

The operation valves 55 are each configured to change a pilot pressure of pilot fluid to be output to the traveling pump (each of the first traveling pump 53L and second traveling pump 53R) in accordance with an operation of the operation lever (operation member) 59. The plurality of operation valves 55 are connected to the two traveling pumps (first traveling pump 53L and second traveling pump 53R) by the traveling fluid passage 45. In other words, the two traveling pumps (first traveling pump 53L and second traveling pump 53R) are hydraulic equipment that are configured to be operated by hydraulic fluid output from the operation valves 55 (that is, the operation valve 55A, operation valve 55B, operation valve 55C, and operation valve 55D). The traveling fluid passage 45 is a fluid passage that connects the operation valves 55 to the traveling pumps (first traveling pump 53L and second traveling pump 53R). Hereafter, the traveling fluid passage 45 may be referred to as a second fluid passage 45.

The traveling fluid passage 45 includes a first traveling fluid passage 45a, a second traveling fluid passage 45b, a third traveling fluid passage 45c, a fourth traveling fluid passage 45d, and a fifth traveling fluid passage 45e. The first traveling fluid passage 45a is a fluid passage connected to a forward-traveling pressure-receiving portion 53a of the first traveling pump 53L. The second traveling fluid passage 45b is a fluid passage connected to a backward-traveling pressure-receiving portion 53b of the first traveling pump 53L. The third traveling fluid passage 45c is a fluid passage connected to a forward-traveling pressure-receiving portion 53a of the second traveling pump 53R. The fourth traveling fluid passage 45d is a fluid passage connected to a backward-traveling pressure-receiving portion 53b of the second traveling pump 53R. The fifth traveling fluid passage 45e is a fluid passage that connects the operation valves 55 to each of the first traveling fluid passage 45a, the second traveling fluid passage 45b, the third traveling fluid passage 45c, and the fourth traveling fluid passage 45d.

When the operation lever 59 is swung forward (in a direction indicated by an arrowed line A1 in FIG. 1), the operation valve 55A is operated, and a pilot pressure is output from the operation valve 55A. This pilot pressure is applied to the pressure-receiving portion 53a of the first traveling pump 53L via the fifth traveling fluid passage 45e and the first traveling fluid passage 45a, and is applied to the pressure-receiving portion 53a of the second traveling pump 53R via the fifth traveling fluid passage 45e and the third traveling fluid passage 45c. In this manner, the swash plate angles of the first traveling pump 53L and the second traveling pump 53R are changed, the first traveling motor 36L and the second traveling motor 36R rotate normally (referred to as forward traveling rotation), and the working device 1 travels straight forward.

When the operation lever 59 is swung backward (in a direction indicated by an arrowed line A2 in FIG. 1), the operation valve 55B is operated, and a pilot pressure is output from the operation valve 55B. This pilot pressure is applied to the pressure-receiving portion 53b of the first traveling pump 53L via the fifth traveling fluid passage 45e and the second traveling fluid passage 45b, and is applied to the pressure-receiving portion 53b of the second traveling pump 53R via the fifth traveling fluid passage 45e and the fourth traveling fluid passage 45d. In this manner, the swash plate angles of the first traveling pump 53L and the second traveling pump 53R are changed, the first traveling motor 36L and the second traveling motor 36R rotate reversely (referred to as backward traveling rotation), and the working device 1 travels straight backward.

When the operation lever 59 is swung rightward (in a direction indicated by an arrowed line A3 in FIG. 1), the operation valve 55C is operated, and a pilot pressure is output from the operation valve 55C. This pilot pressure is applied to the pressure-receiving portion 53a of the first traveling pump 53L via the fifth traveling fluid passage 45e and the first traveling fluid passage 45a, and is applied to the pressure-receiving portion 53b of the second traveling pump 53R via the fifth traveling fluid passage 45e and the fourth traveling fluid passage 45d. In this manner, the swash plate angles of the first traveling pump 53L and the second traveling pump 53R are changed, and the first traveling motor 36L rotates normally and the second traveling motor 36R rotates reversely, and the working device 1 turns to the right.

When the operation lever 59 is swung leftward (in a direction indicated by an arrowed line A4 in FIG. 1), the operation valve 55D is operated, and a pilot pressure is output from the operation valve 55D. This pilot pressure is applied to the pressure-receiving portion 53a of the second traveling pump 53R via the fifth traveling fluid passage 45e and the third traveling fluid passage 45c, and is applied to the pressure-receiving portion 53b of the first traveling pump 53L via the fifth traveling fluid passage 45e and the second traveling fluid passage 45b. In this manner, the swash plate angles of the first traveling pump 53L and the second traveling pump 53R are changed, and the first traveling motor 36L rotates reversely and the second traveling motor 36R rotates normally, and the working device 1 turns to the left.

In addition, when the operation lever 59 is swung in an oblique direction, rotational directions and rotational speeds of the first traveling motor 36L and the second traveling motor 36R are determined by a differential pressure between the pilot pressures applied to the pressure-receiving portion 53a and the pressure-receiving portion 53b, and the working machine 1 turns to the right or the left while traveling forward or backward.

That is, when the operation member 59 is swung diagonally forward to the left, the working machine 1 turns left while traveling forward at a speed corresponding to the swing angle of the operation member 59. When the operation member 59 is swung diagonally forward to the right, the working machine 1 turns right while traveling forward at a speed corresponding to the swing angle of the operation member 59. When the operation member 59 is swung diagonally backward to the left, the working machine 1 turns left while traveling backward at a speed corresponding to the swing angle of the operation member 59. When the operation member 59 is swung diagonally backward to the right, the working machine 1 turns right while traveling backward at a speed corresponding to the swing angle of the operation member 59.

A switching device is configured to shift the rotation speeds of the two traveling motors (first traveling motor 36L and second traveling motor 36R) between the respective first speeds and the respective second speeds. The switching device is the shift switch 61 operably connected to the controller 60, and can be operated by an operator or the like. The switching unit (shift switch 61) can switch the traveling switching valve 34 between acceleration and deceleration: the acceleration for switching the traveling switching valve 34 from the first state to the second state, i.e., switching the traveling motors (first traveling motor 36L and second traveling motor 36R) from the first speed to the second speed, the deceleration for switching the traveling switching valve 34 from the second state to the first state, i.e., switching the traveling motors (first traveling motor 36L and second traveling motor 36R) from the second speed (second state) to the first speed (first state).

The controller 60 is constituted of a semiconductor such as a CPU and an MPU, electrical and electronic circuits, or the like. The controller 60 switches the traveling switching valve 34 between the first state and the second state based on the switching operation of the shift switch 61.

As shown in FIG. 1, an accelerator 65 and a rotation detection device 66 are connected to the controller 60. The accelerator 65 is a component that determines a target rotation speed of the prime mover 32. The accelerator 65 is provided in the vicinity of the driver seat 8. The accelerator 65 is an acceleration lever supported swingably, an acceleration pedal supported swingably, as acceleration volume supported rotatably, an acceleration slider supported slidably, and the like. The accelerator 65 is not limited to the examples described above. The rotation detection device 66 is a sensor or the like configured to detect an actual rotation speed (actual prime mover rotation speed) of the prime mover 32.

The controller 60 performs a control to prevent the prime mover 32 from stopping, that is, a control to prevent an engine from stalling (anti-stall control). For example, in the anti-stall control, when a difference (dropping rotation speed) between a target rotation speed determined by the accelerator 65 and an actual rotation speed detected by the rotation speed detection device 66 is not less than a threshold value (hereinafter referred to as a "first threshold value"), the controller 60 reduces outputs of the traveling pumps (first traveling pump 53L and second traveling pump 53R) to prevent the engine stalling.

The anti-stall control will be described in detail below.

As shown in FIG. 1, the hydraulic system for the working machine 1 is provided with the actuation valve 67.

The actuation valve 67 is a valve configured to change a pilot pressure of pilot fluid that operates the two traveling pumps (first traveling pump 53L and second traveling pump 53R). The actuation valve 67 is provided on the delivery fluid passage 40 through which the pilot fluid flows, and changes the opening degree to change a pilot pressure (operation pilot pressure acting on the pressure receiving portions 53a and 53b) of pilot fluid that actuates the traveling pumps (first traveling pump 53L and second traveling pump 53R).

The actuation valve 67 is actuated by a control signal (e.g., voltage, electric current, etc.) of the controller 60. Hereinafter, a case where the control signal of the controller 60 is an electric current is described, and the current value output as the control signal of the controller 60 is referred to as an "instruction current value". The actuation valve 67 is an electromagnetic proportional valve configured to change an opening degree thereof according to the control signal of the controller 60. The solenoid proportional valve constituting the actuation valve 67 is configured to increase the opening degree in proportion to a magnitude of the instruction current value.

The controller 60 outputs a control signal to the actuation valve 6 to magnetize a solenoid of the actuation valve 67 to change a pilot pressure (primary pressure) applied from the actuation valve 67 to the operation device 54. In this manner, the pilot pressure (primary pressure) to operate the traveling pumps (traveling pump 53L and traveling pump 53R) is changed.

As described above, the controller 60 outputs a control signal to change a pilot pressure (primary pressure) to be output to the operation valves 55. In other words, the primary pressure is determined in accordance with the control signal that is output from the controller 60. In the present embodiment, an opening degree of the actuation valve 67 is determined according to the instruction current value output from the controller 60, and the primary pressure is determined according to the opening degree of the actuation valve 67.

More specifically, as the instruction current value increases, the opening degree of the actuation valve 67 increases, and thus the primary pressure increases. On the other hand, when the instruction current value decreases, the opening degree of the actuation valve 67 decreases, and the primary pressure decreases. That is, there is a proportional relationship or a correspondence (correlation) close to the proportional relationship between the instruction current value and the primary pressure (see FIG. 2). Accordingly, the controller 60 can determine the target pressure of the primary pressure to be output to the operation valves 55 by determining an instruction current value, which is a control signal to be output to the actuation valve 67.

As shown in FIG. 1, a pressure detection device 68 configured to detect a pilot pressure (secondary pressure) output by the operation valves 55 is connected to the controller 60. The pressure detection device 68 is a pressure sensor or the like, and detects a pilot pressure (secondary pressure) of the traveling fluid passage (second fluid passage) 45 connecting the operation valves 55 and the traveling pumps (first traveling pump 53L and second traveling pump 53R).

Specifically, the pressure detection device 68 includes a first pressure detection device 68a, a second pressure detection device 68b, a third pressure detection device 68c, and a fourth pressure detection device 68d.

The first pressure detection device 68a is capable of detecting the first pilot pressure which is a pressure of hydraulic fluid of the first traveling fluid passage 45a. The second pressure detection device 68b is capable of detecting the second pilot pressure which is a pressure of hydraulic fluid of the second traveling fluid passage 45b. The third pressure detection device 68c is capable of detecting the third pilot pressure which is a pressure of hydraulic fluid of the third traveling fluid passage 45c. The fourth pressure detection device 68d is capable of detecting the fourth pilot pressure which is a pressure of hydraulic fluid of the fourth traveling fluid passage 45d.

That is, the pressure detection device 68 detects, as a secondary pressure, the pilot pressures (first pilot pressure, second pilot pressure, third pilot pressure, and fourth pilot pressure) of the traveling fluid passages (second fluid passages) 45. In the above-mentioned embodiment, four pilot pressures (first pilot pressure, second pilot pressure, third pilot pressure, and fourth pilot pressure) can be detected. However, in the anti-stall control, the highest one among the first pilot pressure, second pilot pressure, third pilot pressure, and fourth pilot pressure is used as the secondary pressure. Alternatively, in the anti-stall control, an average value of the first, second, third and fourth pilot pressures may be used as the secondary pressure, or a differential pressure among the first, second, third and fourth pilot pressures may be used as the secondary pressure. The secondary pressure is not limited to the above examples. That is, in the anti-stall control, the differential pressure among the plurality of pilot pressures may be employed as the secondary pressure, a raw pilot pressure may be employed as the secondary pressure, or the absolute value of the differential pressure may be employed as the secondary pressure.

The pressure detection device 68 need only detect the pilot pressures of the traveling fluid passages (second fluid passages) 45. A single detection device serving as the pressure detection device 68 may be connected to the fifth traveling fluid passage 45d (a fluid passage connected to input port sides of the operation valve 55A, the operation valve 55B, the operation valve 55C, and the operation valve 55D), the fifth traveling fluid passage 45d being disposed upstream of the first traveling fluid passage 45a, second traveling fluid passage 45b, third traveling fluid passage 45c, and fourth traveling fluid passage 45d, and a pilot pressure detected by the pressure detection device 68 may be employed as the secondary pressure.

As shown in FIG. 1, the controller 60 is provided with a storage unit 60A, a calculation unit 60B, and a setting change unit 60C. The storage unit 60A is a non-volatile memory. The calculation unit 60B and the setting change unit 60C are electrical/electronic circuits provided in the controller 60, computer programs stored in the controller 60, or the like.

The storage unit 60A stores a correspondence relationship (see FIG. 2) between the target pressure of the primary pressure and a control signal (instruction current value) to be output by the controller 60 to the actuation valve 67. Based on this correspondence relationship, the target pressure of the primary pressure is determined according to the control signal (instruction current value).

The calculation unit 60B calculates a dropping rotation speed by subtracting an actual rotation speed from a target rotation speed based on the target rotation speed defined by the accelerator 65 and the actual rotation speed detected by the rotation speed detection device 66. In addition, the calculation unit 60B calculates a differential pressure between the target pressure of the primary pressure set according to the control signal and a pilot pressure (secondary pressure) output by the operation valves 55 (hereinafter referred to as "generated differential pressure"). Specifically, when a control signal is output from the controller 60 to the actuation valve 67, the calculation unit 60B uses the storage unit 60A to refer to the target pressure of the primary pressure corresponding to the output control signal, and calculates, as the generated differential pressure, a difference between the secondary pressure and the referred-to target pressure of the primary pressure. The generated differential pressure is calculated by subtracting "secondary pressure" from "target pressure of primary pressure". A value of the "secondary pressure" to be used in this calculation is an actually-measured value of the pilot pressure detected by the pressure detection device 68.

Figure 3:
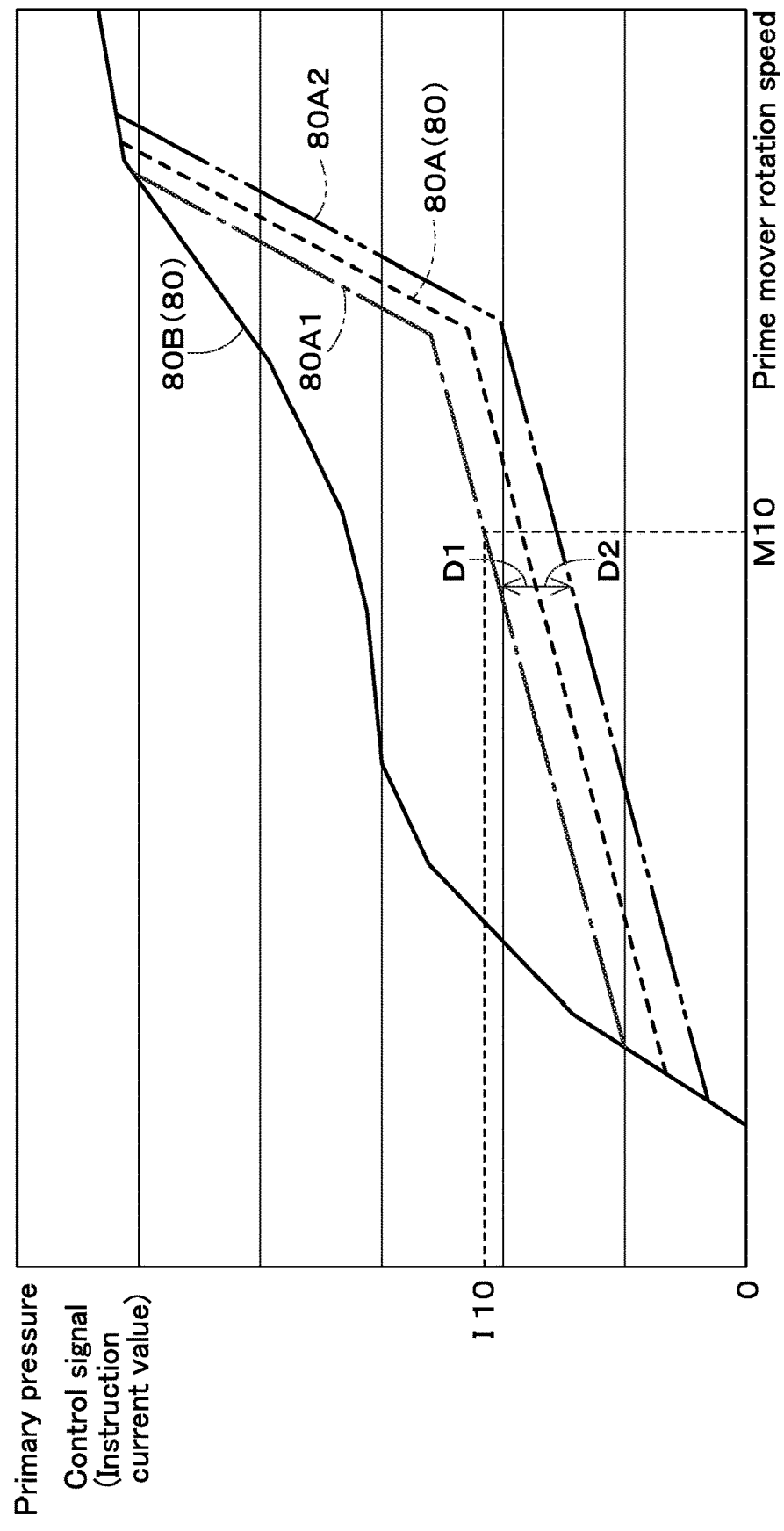
FIG. 3 is a view showing an example of a setting line for setting a control signal (target pressure of primary pressure) based on an actual rotation speed of a prime mover.

The storage unit 60A stores a setting line 80 with which the controller 60 determines the target pressure of the primary pressure based on an actual speed of the prime mover 32 detected by the rotation speed detection device 66. The setting line 80 is set based on a relationship between an actual rotation speed and the primary pressure, the actual rotation speed and the primary pressure being found when the operation valves 55 is in a certain position (e.g., fully-opened position). FIG. 3 is a map (anti-stall map) showing an example of the setting line 80. The setting line 80 includes a first line 80A and a second line 80B.

Figure 2:
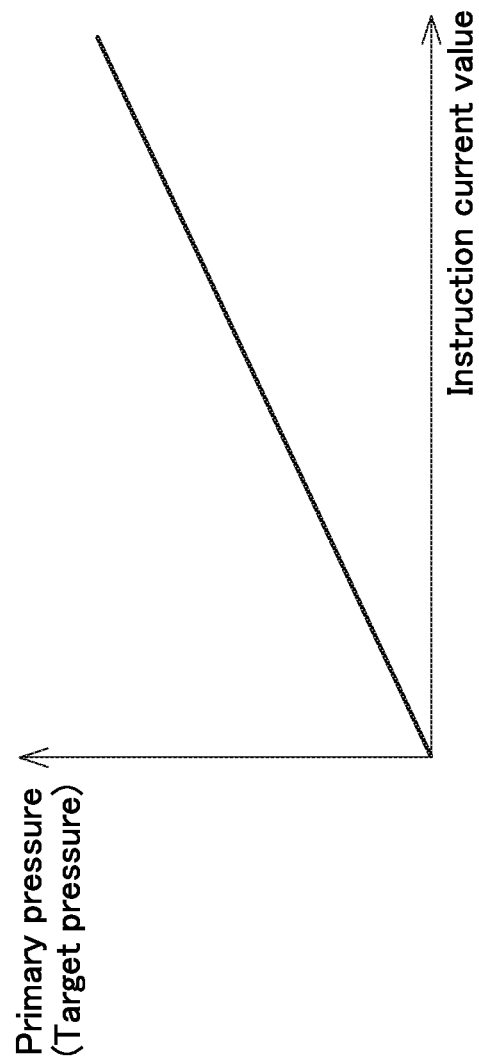
FIG. 2 is a view showing an example of a relationship between a control signal (instruction current value) and a primary pressure.

As described above, a magnitude of an instruction current value that is a control signal output by the controller 60 to the actuation valve 67 is a correspondence relationship such as a proportional relationship with the target pressure of the primary pressure (see FIG. 2). Accordingly, the setting lines shown in FIG. 3 (first line 80A and second line 80B) can be described as setting lines with which a control signal (instruction current value) corresponding to the target pressure of the primary pressure is determined based on the actual rotation speed of the prime mover 32. Accordingly, in FIG. 3, a vertical axis can be referred to as "primary pressure (target pressure)" or as "control signal (instruction current value)".

The first line 80A is a line with which a control signal (instruction current value) corresponding to the target pressure of the primary pressure based on an actual rotation speed when a difference between a target rotation speed and the actual rotation speed of the prime mover 32 (dropping rotation speed) is not less than a first threshold and a differential pressure (generated differential pressure) between the target pressure of the primary pressure and the secondary pressure is not higher than the threshold (hereinafter referred to as a "second threshold").

The second line 80B is a line with which a control signal (instruction current value) corresponding to the target pressure of the primary pressure based on an actual rotation speed when a difference (dropping rotation speed) between the target rotation speed and the actual rotation speed of the prime mover 32 is less than the first threshold. The second line 80B is a line with which a control signal (instruction current value) is determined to be higher than a value on the first line 80A.

The setting change unit 60C changes a setting of a control signal (instruction current value) to be output to the actuation valve 67 based on the target pressure of the primary pressure and the secondary pressure. Specifically, the setting change unit 60C enters a correction mode when the generated differential pressure becomes larger than the second threshold. In the correction mode, the setting change unit 60C shifts the first line 80A. The setting change unit 60C continues the correction mode until the generated differential pressure becomes less than or equal to a third threshold value that is smaller than the second threshold value, and maintains the shifted first line 80A. When the generated differential pressure becomes less than or equal to the third threshold, the setting change unit 60C terminates the correction mode. When the setting change unit 60C is not in the correction mode, the setting change unit 60C does not shift the first line 80A. Hereinafter, for convenience of explanation, the first line 80A that has not been shifted or the first line 80A before being shifted may be referred to as an "initial first line 80A". The second threshold in the first embodiment is also referred to as a "differential pressure threshold".

The setting change unit 60C changes a control signal represented on the first line 80A to shift the first line 80A. For example, the setting change unit 60C increases an instruction current value I10 to shift the first line 80A upward, the instruction current value I10 being a control signal set based on an actual rotation speed M10 (see an arrowed line D1 in FIG. 3). Or, the setting change unit 60C decreases the instruction current value I10 to shift the first line 80A downward, the instruction current value I10 being a control signal set based on the actual rotation speed M10 (see an arrowed line D2 in FIG. 3).

In more detail, when the generated differential pressure is larger than the second threshold (differential pressure threshold) and the secondary pressure is larger than the target pressure of the primary pressure, the setting change unit 60C shifts the first line 80A in a direction in which the target pressure of the primary pressure output from the actuation valve 67 becomes smaller (a direction to decrease the instruction current value). When the generated differential pressure is larger than the second threshold (differential pressure threshold) and the secondary pressure is smaller than the target pressure of the primary pressure, the setting change unit 60C shifts the first line 80A in the direction where the primary pressure output from the actuation valve 67 becomes larger (a direction to increase the instruction current value).

In FIG. 3, the first line 80A after the shifting in the direction in which the target pressure of the primary pressure becomes larger is shown by a dashed-dotted line 80A1, and the first line 80A after the shifting in the direction in which the target pressure of the primary pressure becomes smaller is shown by a double-dotted line 80A2. That is, the setting change unit 60C shifts the initial first line 80A shown by the solid line to the first line 80A1 shown by the single point chain line or the first line 80A2 shown by the double point chain line.

As described above, when the generated differential pressure is larger than the second threshold (differential pressure threshold) and the secondary pressure is larger than the target pressure, the setting change unit 60C shifts the first line 80A in the direction in which the target pressure of the primary pressure becomes smaller, thereby suppressing excessive engine-speed dropping. In addition, when the generated differential pressure is larger than the second threshold (differential pressure threshold) and the secondary pressure is smaller than the target pressure of the primary pressure, the setting change unit 60C shifts the first line 80A in the direction in which the target pressure of the primary pressure becomes larger. In this manner, it can be suppressed to give an operator a feeling that a traveling force is reduced in recovering from the engine-speed dropping (the feeling being caused by reduction of a pressure (traveling pressure) in the circulation fluid passages 57h and 57i due to decreasing of flowrates of the traveling pumps 53L and 53R).

Figure 4:
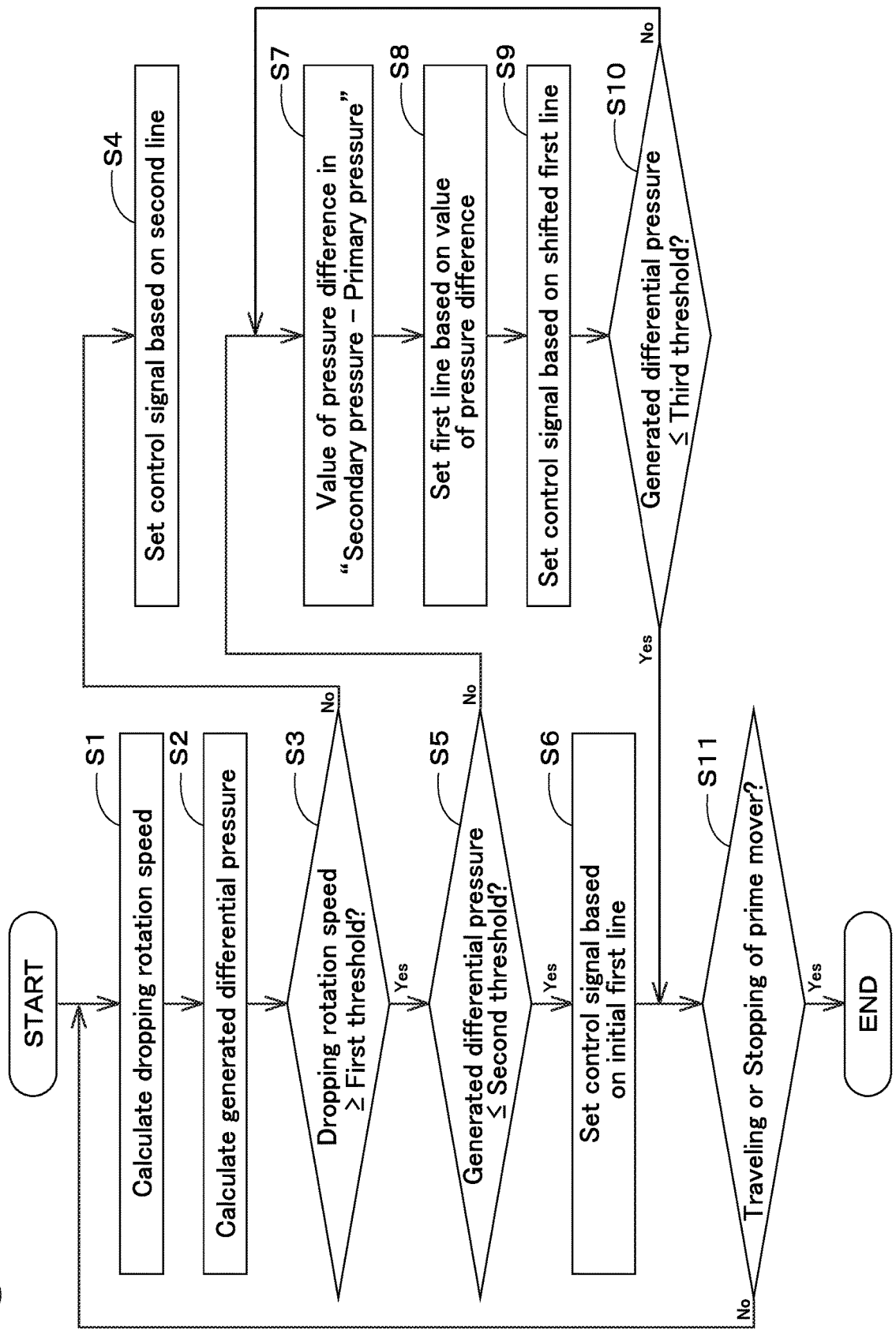
FIG. 4 is an operation flow showing a flow in which a controller changes a setting of the control signal according to the first embodiment.

FIG. 4 is an operation flow showing a flow of an operation in which the controller 60 changes the control signal (instruction current value) according to the first embodiment.

The calculation unit 60B calculates the dropping rotation speed by subtracting the actual rotation speed from the target rotation speed based on the target rotation speed defined by the accelerator 65 and the actual rotation speed detected by the rotation speed detection device 66 (step S1). In addition, the calculation unit 60B calculates the differential pressure (generated differential pressure) between the target pressure of the primary pressure determined according to the instruction current value and the pilot pressure (secondary pressure) output by the operation valves 55 (step S2). Next, the setting change unit 60C judges whether or not the dropping rotation speed is not less than the first threshold (step S3). When the dropping rotation speed is less than the first threshold (step S3, No), the setting change unit 60C sets the control signal (instruction current value) based on the second line 80B (step S4). When the dropping rotation speed is not less than the first threshold (step S3, Yes), the setting change unit 60C judges whether or not the generated differential pressure is not higher than the second threshold (differential pressure threshold) (step S5). When the generated differential pressure is not higher than the second threshold (step S5, Yes), the setting change unit 60C sets the control signal (instruction current value) based on the initial first line 80A stored in the storage unit 60A (step S6). When the generated differential pressure is not less than the second threshold (step S5, No), the setting change unit 60C calculates a value of pressure difference by subtracting the target pressure of the primary pressure from the secondary pressure (step S7). Based on the value of pressure difference, the setting change unit 60C sets the first line 80A1 displaced in a direction (a direction of an arrowed line D1 in FIG. 3) in which the primary pressure becomes larger relative to the first line (initial first line) 80A, or the first line 80A2 displaced in a direction (a direction of an arrowed line D2 in FIG. 3) in which the primary pressure becomes smaller relative to the first line (initial first line) 80A. For example, the setting change unit 60C obtains a displacement value relative to the initial first line 80A by using the value of pressure difference and the correction coefficient, sets the first line 80A1 by shifting the initial first line 80A in the direction of arrowed line D1 in FIG. 3 according to a displacement amount, and sets the first line 80A2 by shifting the initial first line 80A in the direction of arrowed line D2 in FIG. 3 according to a displacement amount. The correction coefficient is a value to be used to convert the value of pressure difference into the control signal.

The setting change unit 60C sets the control signal (instruction current value) based on the shifted first lines 80A1 and 80A2 (step S9). The setting change unit 60C judges whether or not the generated differential pressure is not higher than the third threshold (step S10). When the generated differential pressure is not higher than the third threshold (step S10, Yes), the setting change unit 60C terminates the correction mode. After the termination of the correction mode, the setting change unit 60C gradually returns the control signal to a value corresponding to the first line 80A or the second line 80B by gradually changing the correction coefficient.

In the above-described embodiment, the shifted first line 80A1 and 80A2 are created by shifting the first line (initial first line) 80A according to the displacement amount. However, a reference value representing the first line (initial first line) 80A may be set for each rotation speed of the prime mover 32, and then the control signals corresponding to the first lines 80A1 and 80A2 may be obtained by adding or subtracting the displacement amount to the reference value.

In the following, a specific example of a changing method in which the setting change unit 60C changes the setting of the instruction current value will be described.

The setting change unit 60C can change the setting of the instruction current value based on a correction coefficient (gain) determined corresponding to a value of the generated differential pressure (value of pressure difference). The storage unit 60A stores a function that defines a relationship between the generated differential pressure and the correction coefficient (hereinafter referred to as the "correction function").

Figure 5:
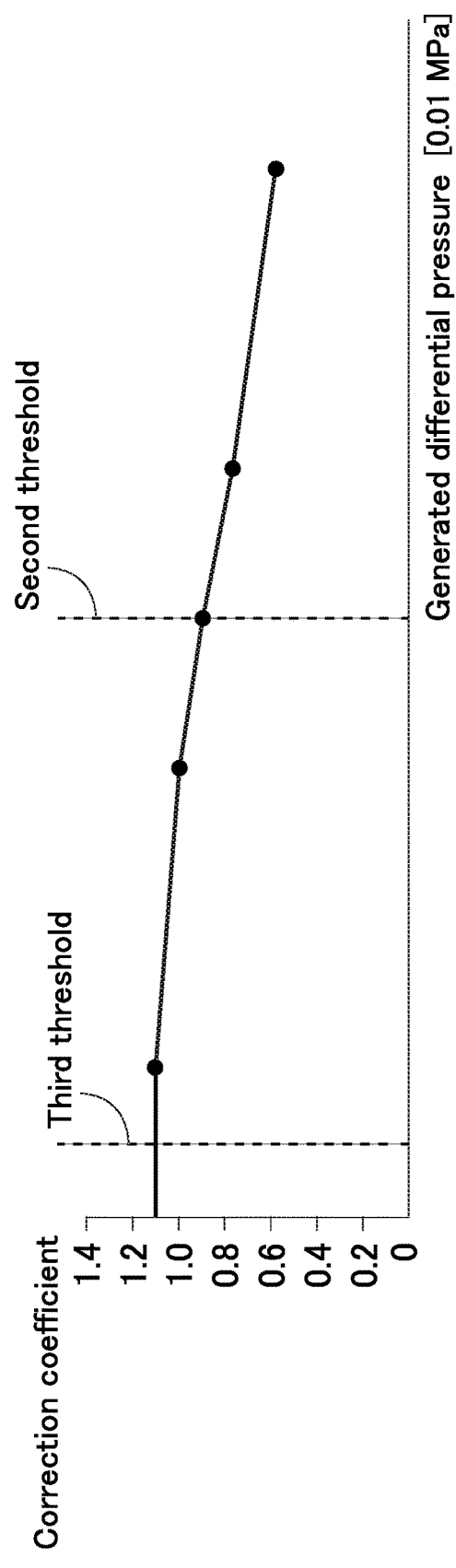
FIG. 5 is a view showing one example of a correction function defining a relationship between a generated differential pressure and a correction coefficient according to the first embodiment.

FIG. 5 shows an example of the correction function. As shown in FIG. 5, the correction coefficient and the generated differential pressure are generally in a linear relationship. The correction coefficient decreases monotonically as the generated differential pressure increases in the positive direction (a direction in which a negative value decreases and a positive value increases). When the generated differential pressure is zero, the correction coefficient is 1. When the generated differential pressure is positive, the correction coefficient is a value less than 1 and decreases substantially-linearly with the increase in the positive value of the generated differential pressure. When the generated differential pressure is negative, the correction coefficient is a value greater than 1 and increases substantially-linearly along with the increase in the negative value of the generated differential pressure.

The setting change unit 60C calculates the correction coefficient by substituting the generated differential pressure calculated by the calculation unit 60B into the correction function. For example, in the case of using the correction function shown in FIG. 5, when the generated differential pressure calculated by the calculation unit 60B is +0.2 MPa (corresponding to a scale of +20 on the horizontal axis), the correction coefficient is calculated as 0.8.

The setting change unit 60C changes a setting of the instruction current value based on the calculated correction coefficient. Specifically, by multiplying the calculated correction coefficient by the instruction current value of the control signal shown in the first line 80A, the control signal (instruction current value) to be output to the actuation valve 67 is changed. In this manner, the first line 80A is shifted.

When the correction coefficient is 1 (when the generated differential pressure is 0), the instruction current value is not changed even when the setting change unit 60C multiplies the instruction current value by the correction coefficient, and thus the first line 80A is not changed. In a case where the correction coefficient is less than 1 (when the generated differential pressure is a positive value), the instruction current value decreases when the setting change unit 60C multiplies the instruction current value by the correction coefficient, and thus the first line 80A is shifted in the direction where the primary pressure to be output from the actuation valve 67 becomes smaller. That is, in FIG. 3, the first line 80A is shifted in the direction shown by the arrowed line D2. In a case where the correction coefficient is greater than 1 (when the generated differential pressure is a negative value), the instruction current value increases when the setting change unit 60C multiplies the instruction current value by the correction coefficient, and thus the first line 80A is shifted in the direction to increase the primary pressure to be output from the actuation valve 67. That is, in FIG. 3, the first line 80A is shifted in the direction indicated by the arrowed line D1.

In a case where the setting change unit 60C changes the control signal (instruction current value) based on the correction coefficient calculated with the correction function shown in FIG. 5, the second threshold (differential pressure threshold) described above is 0. Accordingly, when the generated differential pressure is 0, it is determined that the generated differential pressure is not less than the second threshold (0 or less). On the other hand, except when the generated differential pressure is 0, it is determined that the generated differential pressure (absolute value of the generated differential pressure) is higher than the second threshold (that is greater than 0), and the first line 80A is shifted.

However, the second threshold (differential pressure threshold) need not be 0. It may be set to a value in a certain range including 0 (e.g., a range from a negative value that is smaller by a predetermined value than 0 to a positive value that is larger by a predetermined value than 0). For example, when the correction function is set so that the generated differential pressure can be in a range from −0.01 MPa to +0.01 MPa and the correction coefficient becomes 1.0, the second threshold is in a range from −0.01 MPa to +0.01 MPa. In this case, when the absolute value of the generated differential pressure becomes greater than 0.01 MPa, it is determined that the generated differential pressure has become greater than the second threshold, and then the first line 80A is shifted.

The changing method in which the setting change unit 60C changes a setting of the control signal is not limited to the method using the correction coefficient as described above. For example, the setting change unit 60C may be configured to change a setting value of the control signal (instruction current value) output to the actuation valve 67 by changing an anti-stall map according to the generated differential pressure. In detail, a plurality of different anti-stall maps (anti-stall maps with different first lines 80A) corresponding to different generated differential pressures may be stored in the storage unit 60A in advance, and the setting change unit 60C may select the anti-stall map corresponding to the generated differential pressure according to the generated differential pressure and may change a setting value of instruction current value based on the first line 80A indicated in the anti-stall map.

In the above-described embodiment, the actuation valve 67 is provided upstream of the operation valves 55 (delivery fluid passage 40). Alternatively, the actuation valve 67 may be provided at an intermediate portion of the fifth traveling fluid passage 45e, for example.

Figure 6:
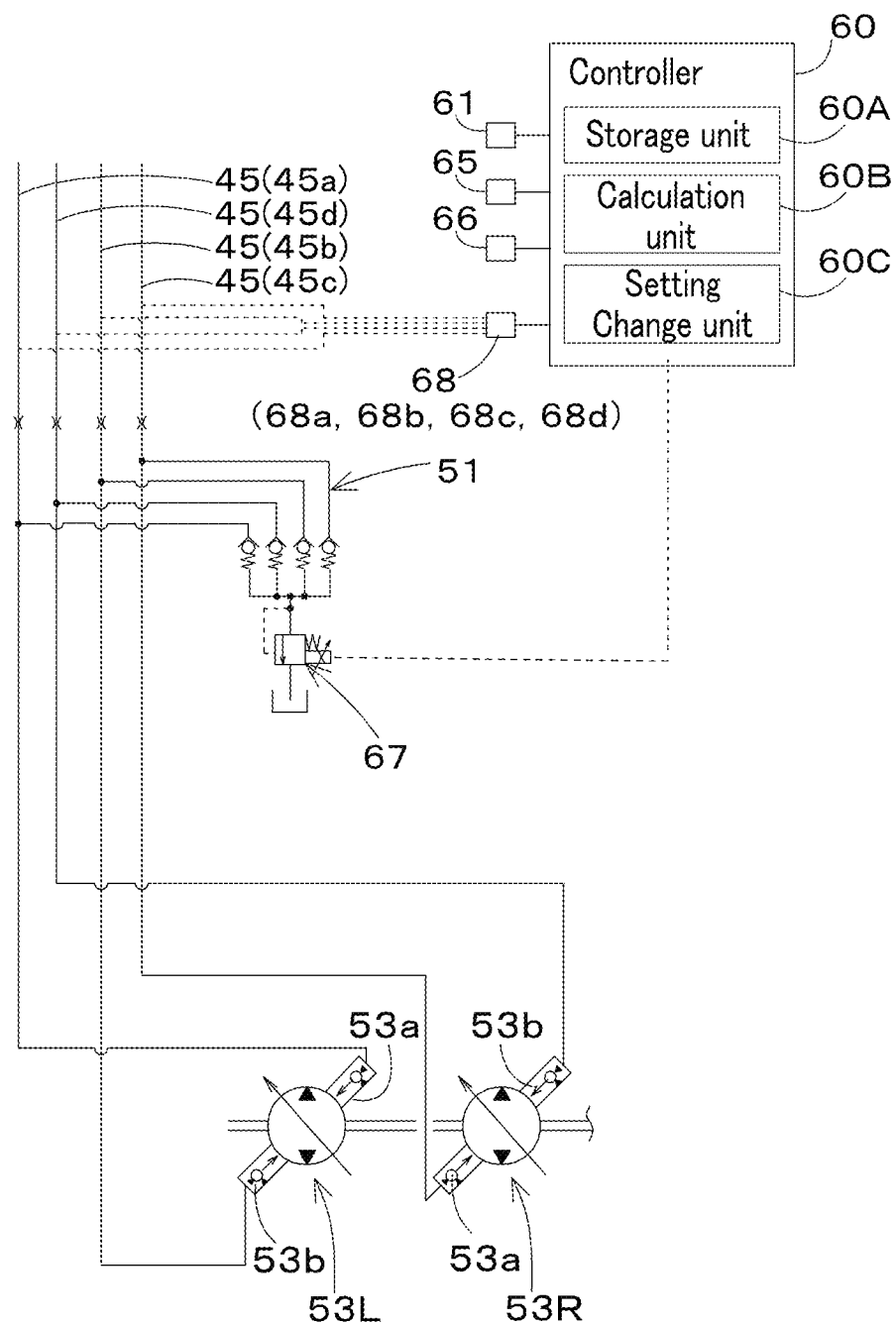
FIG. 6 is a view showing an example in which an actuation valve is disposed on a secondary port side of an operation valve according to the first embodiment.

Alternatively, as shown in FIG. 6, the actuation valve 67 may be provided on the traveling fluid passage 45 that is connected to the traveling pumps (left traveling pump 53L and right traveling pump 53R). Specifically, fluid passages 51 may be branched from the respective first traveling fluid passage 45a, second traveling fluid passage 45b, third traveling fluid passage 45c, and fourth traveling fluid passage 45d, the actuation valves 67 such as variable relief valves or electromagnetic proportional valves may be disposed on the respective fluid passages 51. In this manner, opening degrees of the actuation valves 67 may be controlled according to the first control signal and the second control signal.

In the above-described embodiment, the traveling operation device 54 employs a hydraulic type where the operation valves 55 change pilot pressures acting on the traveling pumps (first traveling pump 53L and second traveling pump 53R). Alternatively, as shown in FIG. 7, the traveling operation device 54 may be an electrically-operable device.

Figure 7:
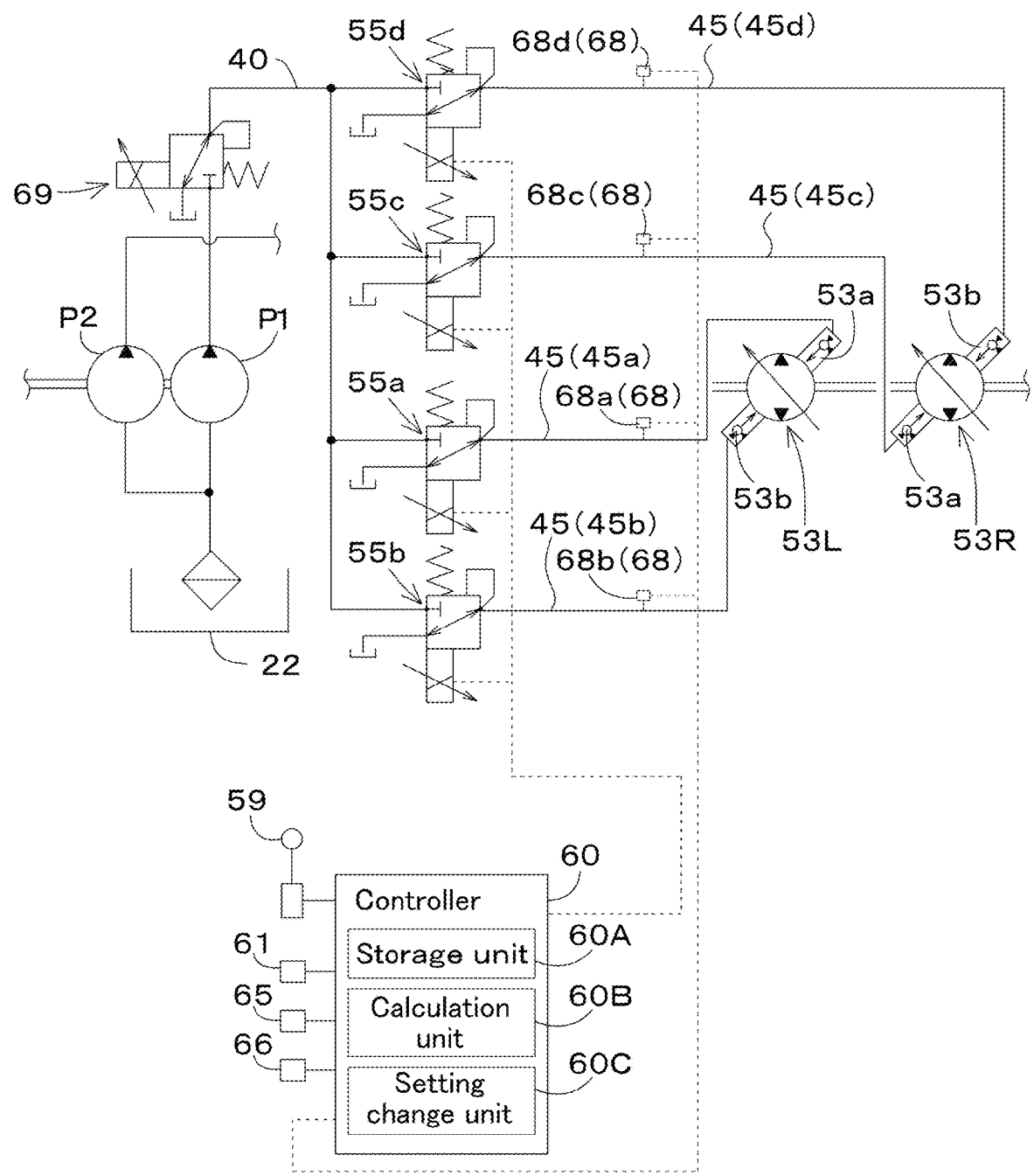
FIG. 7 is a view showing a modified example in which an operation device according to the first embodiment is replaced by an electrically-operable operation device such as a joystick.

As shown in FIG. 7, the traveling operation device 54 has the operation member 59 swingable in the lateral direction (that is, the machine width direction) or the fore-and-aft direction, and the operation valves 55 (that is, the operation valves 55A, 55B, 55C, and 55D) constituted of electromagnetic proportional valves. The controller 60 is connected to an operation detector configured to detect an operation amount and operational direction of the operation member 59. The controller 60 controls the operation valves 55 (that is, the operation valves 55A, 55B, 55C, and 55D) based on the operation amount and operational direction detected by the operation detector.

When the operation member 59 is operated forward (in the direction A1, see FIG. 1), the controller 60 outputs a control signal to the operation valves 55A and 55C to tilt the swash plates of first and second traveling pumps 53L and 53R in respective directions for the normal rotation (forward traveling).

When the operation member 59 is operated backward (in the direction A2, see FIG. 1), the controller 60 outputs a control signal to the operation valves 55B and 55D to tilt the swash plates of first and second traveling pumps 53L and 53R in respective directions for the reverse rotation (backward traveling).

When the operation member 59 is operated to the right (in the direction A3, see FIG. 1), the controller 60 outputs a control signal to the operation valves 55A and 55D to tilt the swash plate of first traveling pump 53L in the direction for the normal rotation and the swash plate of second traveling pump 53R in the direction for the reverse rotation.

When the operation member 59 is operated to the left (in the direction A4, see FIG. 1), the controller 60 outputs a control signal to the operation valves 55B and 55C to tilt the swash plate of first traveling pump 53L in the direction for the reverse rotation and the swash plate of second traveling pump 53R in the direction for the normal rotation.

As described above, the working machine 1 includes the prime mover 32, the traveling pumps 53L and 53R configured to be driven by power of the prime mover 32 so as to deliver hydraulic fluid, the traveling motors 36L and 36R configured to be rotated by the hydraulic fluid delivered from the traveling pumps 53L and 53R, the operation valves 55 each configured to change a pilot pressure of pilot fluid output therefrom to the corresponding traveling pump 53L or 53R according to operation of the operation member 59, the actuation valve 67 configured to be activated according to a control signal so as to change a primary pressure that is the pilot pressure of the pilot fluid to be supplied to the operation valves 55, the controller 60 configured or programmed to perform setting of the control signal to be output to the actuation valve 67, and the pressure detection device 68 configured to detect the secondary pressure that is the pilot pressure output from the operation valves 55. The controller 60 includes the setting change unit 60C configured or programmed to change, based on the primary pressure and the secondary pressure, the setting of the control signal to be output to the actuation valve 67.

According to this configuration, the controller 60 can use the setting change unit 60C to change the setting of the control signal to be output to the actuation valve 67 based on the primary pressure and the secondary pressure. Accordingly, the setting change unit 60C is configured to change the primary pressure, which is a pilot pressure of the pilot fluid that the actuation valve 67 supplies to the operation valves 55, based on the primary pressure and the secondary pressure. Through this changing, the working machine 1 is capable of preventing the work efficiency from being deteriorated due to excessive engine-speed dropping, and preventing a feeling that a traveling force is reduced in recovering from the engine-speed dropping, even when a tracking ability of the actuation valve 67 (tracking ability of the secondary pressure to the primary pressure) is poor.

In addition, the controller 60 includes the calculation unit 60B configured or programmed to calculate a differential pressure between a target pressure of the primary pressure determined in correspondence to the control signal and the secondary pressure.

According to this configuration, the controller 60 can use the calculation unit 60B to calculate a differential pressure between the secondary pressure and the target pressure of the primary pressure determined according to the control signal. Accordingly, the setting change unit 60C can, based on the differential pressure calculated through the calculation, change the setting of the control signal to be output to the actuation valve 67 to an appropriate setting that is effective for suppressing the excessive engine-speed dropping and preventing the feeling that the traveling force is reduced.

In addition, the controller 60 includes the storage unit 60A configured or programmed to store a correlation between the control signal and the target pressure. When the control signal is output to the actuation valve 67, the calculation unit 60B is configured or programmed to use the storage unit 60A so as to refer to the target pressure corresponding to the output control signal, and to calculate the differential pressure between the referred-to target pressure and the secondary pressure.

According to this configuration, the setting change unit 60C can appropriately change a setting of the control signal to be output to the actuation valve 67 based on the differential pressure between the target pressure and the secondary pressure.

In addition, the working machine 1 includes the accelerator 65 operable to set the target rotation speed of the prime mover 32, and the rotation speed detection device 66 configured to detect an actual rotation speed of the prime mover 32. The storage unit 60A is configured or programmed to store the first line 80A that represents the control signal corresponding to the target pressure to be set based to the actual rotation speed when a difference between the target rotation speed and the actual rotation speed is not smaller than the first threshold and the differential pressure is not larger than the second threshold, and to store the second line 80B that represents the control signal corresponding to the target pressure to be set based on the actual rotation speed when the difference between the target rotation speed and the actual rotation speed is smaller than the first threshold. The setting change unit 60C is configured or programmed to change, when the differential pressure becomes larger than the second threshold, the control signal represented by the first line 80A so as to shift the first line 80A.

According to this configuration, the setting change unit 60C can appropriately change the setting of the control signal to be output to the actuation valve 67 according to three cases: a first case where a load acting on the prime mover 32 is low (a difference between the target rotation speed and the actual rotation speed is less than the first threshold), a second case where the load on the prime mover 32 is high (the difference between the target rotation speed and the actual rotation speed is not less than the first threshold) and the differential pressure is low (not higher than the second threshold), and a third case where the load on the prime mover 32 is high and the differential pressure is high (higher than the second threshold).

In addition, the setting change unit 60C is configured or programmed to finish, when the differential pressure becomes not larger than a third threshold that is smaller than the second threshold, the shifting of the first line 80A.

According to this configuration, the setting change unit 60C can continue to shift the first line 80A until the differential pressure becomes the third threshold which is smaller than the second threshold.

In addition, the setting change unit 60C is configured or programmed to gradually restore, when the shifting of the first line 80A is finished, the control signal to the value before the shifting of the first line 80A.

According to this configuration, the setting change unit 60C can gradually return the control signal to be output to the actuation valve 67 from the control signal set by shifting the first line 80A to the control signal set by the original first line 80A before the shifting, thereby suppressing sudden fluctuation in pressure of the secondary pressure (primary pressure) at the end of the shifting of the first line 80A.

In addition, the actuation valve 67 is a solenoid proportional valve configured to increase an opening degree thereof in proportion to a magnitude of current value. The setting change unit 60C is configured or programmed to shift the first line in a direction such as to reduce the primary pressure output from the actuation valve 67 when the differential pressure is larger than the second threshold and the secondary pressure is larger than the target pressure, and to shift the first line in a direction such as to increase the primary pressure output from the actuation valve 67 when the differential pressure is larger than the second threshold and the secondary pressure is less than the target pressure.

According to this configuration, when the differential pressure is greater than the second threshold and the secondary pressure is greater than the target pressure, the setting change unit 60C shifts the first line in a direction in which the primary pressure to be output from the actuation valve 67 becomes smaller, thereby suppressing the excessive engine-speed dropping and deteriorating the work efficiency. When the differential pressure is larger than the second threshold and the secondary pressure is smaller than the target pressure, the setting change unit 60C shifts the first line in a direction in which the primary pressure to be output from the actuation valve 67 becomes larger, thereby preventing the occurrence of a feeling that a traveling force is reduced in recovering from engine-speed dropping.

In addition, the setting change unit 60C changes a setting of the control signal output to the actuation valve 67 based on a correction coefficient set corresponding to a value of the differential pressure.

According to this configuration, since the setting change unit 60C can change the setting of the control signal to be output to the actuation valve 67 with use of the correction coefficient set corresponding to the value of the differential pressure, the setting of the control signal to be output to the actuation valve 67 corresponding to the value of the differential pressure can be changed easily and appropriately.

The storage unit 60A stores a function defining a relationship between the differential pressure and the correction coefficient. The setting change unit 60C calculates the correction coefficient by substituting the differential pressure calculated by the calculation unit 60B into the function.

According to this configuration, the setting change unit 60C can easily and accurately calculate the correction coefficient by using a function that defines the relationship between the differential pressure and the correction coefficient.

The working machine 1 includes the first fluid passage 40 connecting the operation valves 55 to the actuation valve 67, and the second fluid passage 45 connecting the operation valves 55 to the traveling pumps 53L and 53R. The pressure detection device 68 detects, as the secondary pressure, a pilot pressure in the second fluid passage 45.

According to this configuration, the secondary pressure, which is a pilot pressure to be output by the operation valves 55, can be reliably and accurately detected by the pressure detection device 68.

Second Embodiment

Figure 8:
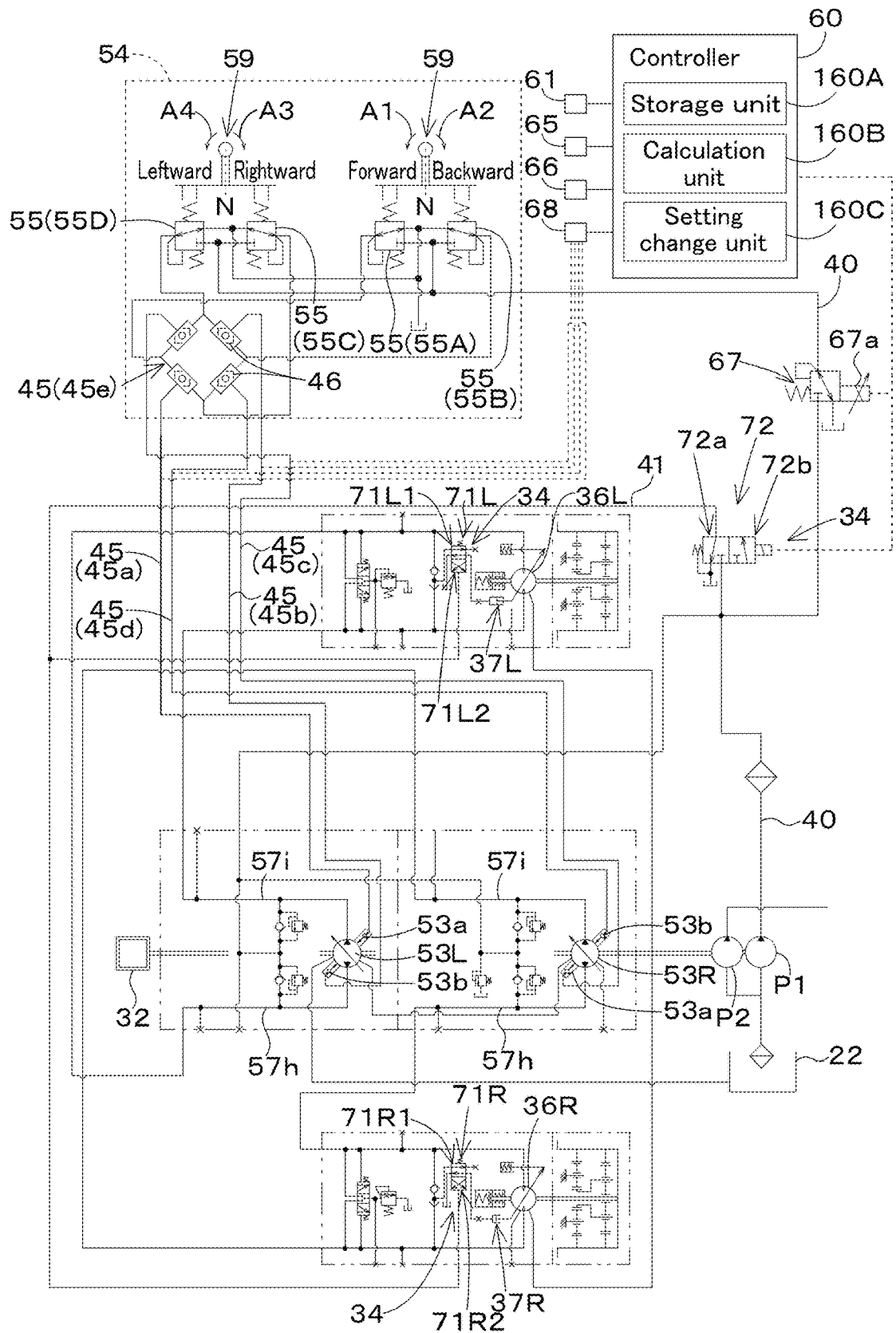
FIG. 8 is a view showing a hydraulic system (hydraulic circuit) for a working machine according to a second embodiment.

FIG. 8 shows another embodiment (second embodiment) of the working machine 1. In the first embodiment, the working machine 1 changes the primary pressure based on the primary pressure and the secondary pressure, and even when the tracking ability of the actuation valve 67 (tracking ability of the secondary pressure to the primary pressure) is poor, the work efficiency is prevented from decreasing due to the excessive engine-speed dropping, and it is prevented to cause a feeling that a traveling force is reduced in recovering from the engine-speed dropping. Contrarily, in the working machine 1 according to the second embodiment, the primary pressure is changed based on a derivative value representing a rate of change of the actual rotation speed with respect to time, and even when a response of the anti-stall control (tracking ability of the secondary pressure to the primary pressure) is poor, the work efficiency is prevented from decreasing due to the excessive engine-speed dropping, and it is prevented to cause a feeling that a traveling force is reduced in recovering from the engine-speed dropping.

The working machine 1 according to the second embodiment will be described below, focusing on the configurations that differ from those of the first embodiment, and the same reference numerals are given to the same configurations as those of the first embodiment to omit detailed explanations thereof.

For convenience of explanation, a storage unit according to the second embodiment is hereinafter described with a reference numeral as "storage unit 160A," the calculation unit is described with a reference numeral as "calculation unit 160B," and the setting change unit is described with a reference numeral as "setting change unit 160C," as shown in FIG. 8. That is, the controller 60 according to the second embodiment is provided with a storage unit 160A, a calculation unit 160B, and a setting change unit 160C.

The storage unit 160A is a non-volatile memory. The calculation unit 160B and the setting change unit 160C are constituted of electrical/electronic circuits provided in the controller 60, computer programs stored in the controller 60, or the like.

Similar to the storage unit 60A according to the first embodiment, the storage unit 160A stores a correspondence relationship (see FIG. 2) between the primary pressure and the control signal (instruction current value) to be output by the controller 60 to the actuation valve 67. The primary pressure is determined according to the control signal (instruction current value) based on this correspondence relationship. In detail, the storage unit 160A stores a setting line 80 on which the primary pressure (specifically, a target value of the primary pressure) is determined based on the actual rotation speed of the prime mover 32, similar to the storage unit 60A according to the first embodiment.

In the second embodiment, the first line 80A is a line on which the control signal (instruction current value) is determined based on the actual rotation speed when a difference between the target rotation speed and the actual rotation speed of the prime mover 32 (dropping rotation speed) is not less than the first threshold.

The calculation unit 160B calculates the dropping rotation speed by subtracting the actual rotation speed from the target rotation speed based on the target rotation speed set by the accelerator 65 and the actual rotation speed detected by the rotation speed detection device 66. In addition, the calculation unit 160B calculates a derivative value representing a rate of change (rate of change with respect to time) of the actual rotation speed of the prime mover 32.

When the dropping rotation speed is less than the first threshold, the setting change unit 160C determines the control signal (instruction current value) based on the second line 80B. When the dropping rotation speed is not less than the first threshold, the setting change unit 160C determines the control signal (instruction current value) based on the first line 80A.

Unlike the setting change unit 60C according to the first embodiment, the setting change unit 160C according to the second embodiment changes the setting of the control signal (instruction current value) to be output to the actuation valve 67 based on the derivative value calculated by the calculation unit 160B. Specifically, the setting change unit 160C shifts the first line 80A when the derivative value becomes larger than the fourth threshold. When the derivative value is not greater than the fourth threshold, the setting change unit 160C does not shift the first line 80A. The fourth threshold is hereinafter also referred to as the "derivative threshold".

The shifting (or changing) of the first line 80A by the setting change unit 160C is performed by changing the control signal represented on the first line 80A. For example, the shifting is made to shift the first line 80A upward by increasing the instruction current value I10, which is a control signal set based on the actual rotation speed M10 (see an arrowed line D1 in FIG. 3). Or, the shifting is made to shift the first line 80A downward by decreasing the instruction current value I10, which is a control signal set based on the actual rotation speed M10 (see an arrowed line D2 in FIG. 3).

In the present embodiment, the setting change unit 160C shifts the first line 80A in a direction in which the primary pressure to be output from the actuation valve 67 is reduced (in which the instruction current value decreases) when the derivative value is larger in a positive direction than the fourth threshold (derivative threshold). The setting change unit 160C shifts the first line 80A in a direction in which the primary pressure to be output from the actuation valve 67 is increased (in which the instruction current value increases) when the derivative value is larger in a negative direction than the fourth threshold (derivative threshold).

In FIG. 3, the first line 80A shifted in the direction in which the primary pressure increases is shown by the dashed-dotted line 80A1, and the first line 80A shifted in the direction in which the primary pressure decreases is shown by the double-dotted line 80A2. That is, the setting change unit 160C shifts the initial first line 80A shown by a solid line to the first line 80A1 shown by the dashed-dotted line or the first line 80A2 shown by the double-dotted line based on the derivative value.

In more detail, the setting change unit 160C enters a correction mode when the derivative value becomes equal to or greater than the fourth threshold (derivative threshold). In addition, after entering the correction mode, the setting change unit 160C terminates the correction mode when the derivative value becomes less than or equal to the fifth threshold value that is smaller than the fourth threshold value. When the setting change unit 160C is not in the correction mode, the setting change unit 60C does not shift the first line 80A.

In the correction mode, when the derivative value is larger than the fourth threshold (derivative threshold) in a positive direction (i.e., when the engine-speed is rapidly dropping), the setting change unit 160C can suppress the excessive engine-speed dropping by shifting the first line 80A in a direction where the primary pressure is reduced. In addition, in the correction mode, when the derivative value is larger than the fourth threshold (derivative threshold) in the negative direction and larger than the fifth threshold (in recovering from the engine-speed dropping), the setting change unit 160C continues the correction mode and shifts the first line 80A in the direction where the primary pressure is increased, thereby suppressing the occurrence of a feeling that a traveling force is reduced in recovering from engine-speed dropping (caused by a reduction in pressures (traveling pressures) of the circulation fluid passages 57h and 57i due to a reduction in the flowrate of the traveling pumps 53L and 53R).

Figure 9:
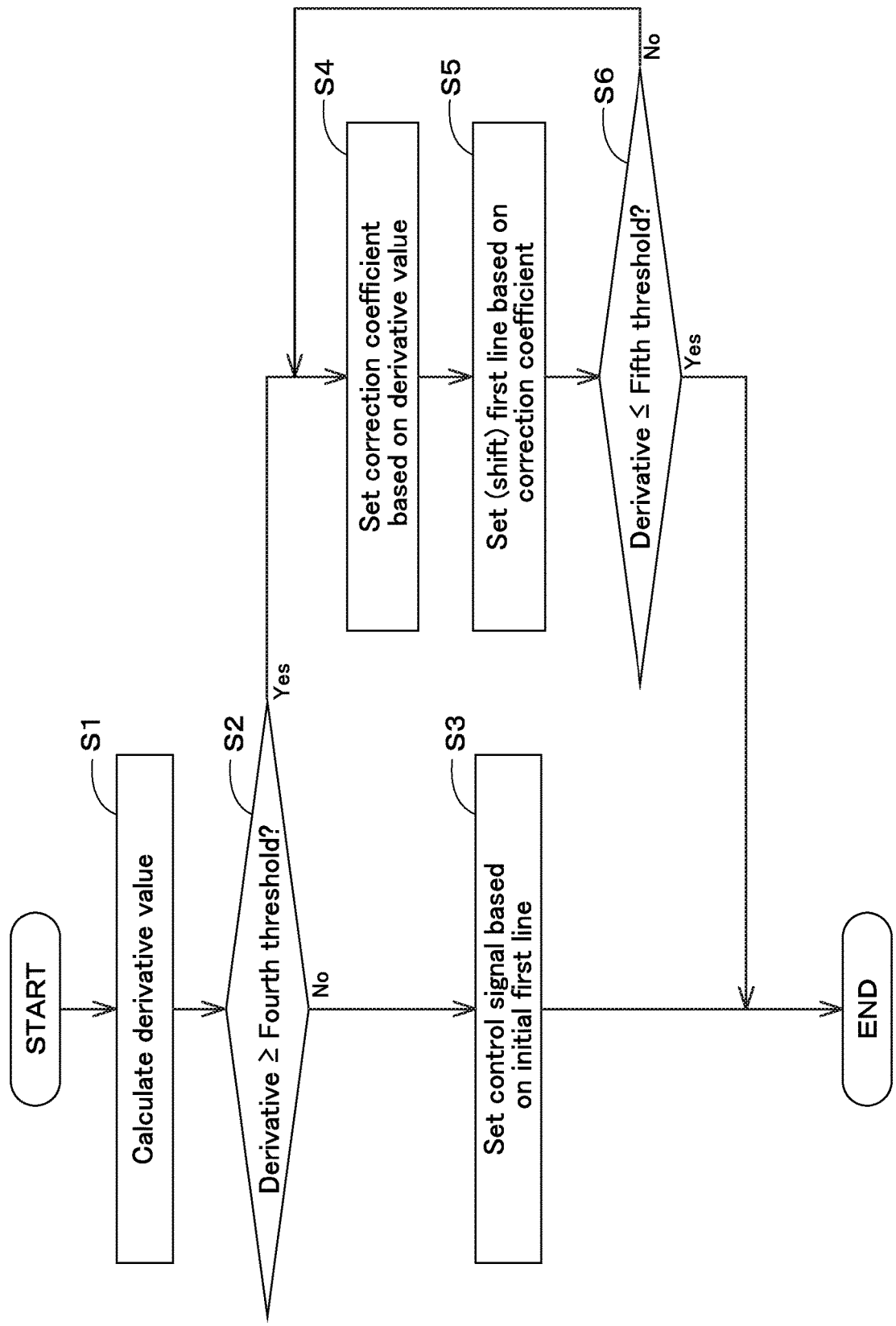
FIG. 9 is an operation flow showing a flow in which a controller changes a setting of the control signal according to the second embodiment.

FIG. 9 is an operation flow of shifting the first line 80A in the controller 60. When the dropping rotation speed is less than the first threshold, the setting change unit 160C determines the control signal (instruction current value) based on the second line 80B. When the dropping rotation speed is not less than the first threshold, the setting change unit 160C determines the control signal (instruction current value) based on the first line 80A.

As shown in FIG. 9, in determining the control signal (instruction current value) based on the first line 80A, the calculation unit 160B calculates a derivative value representing a rate of change (rate of change with respect to time) of the actual rotation speed of the prime mover 32 (step S21). The setting change unit 160C judges whether or not the derivative value is not less than the fourth threshold (derivative threshold) (step S22). When the derivative value is less than the fourth threshold (step S22, No), the setting change unit 160C determines the control signal (instruction current value) based on the initial first line 80A stored in the storage unit 160A (step S23). That is, when the derivative value is less than the fourth threshold, the setting change unit 160C does not change the initial first line 80A.

When the derivative value is not less than the fourth threshold value (step S22, Yes), the setting change unit 160C refers to a control map showing a relationship between the derivative value and the correction coefficient, as shown in FIG. 9, and determines the correction coefficient (step S24).

In detail, when the derivative value is not less than the fourth threshold (S22, Yes), the setting change unit 160C enters the correction mode and determines the correction coefficients based on the line L10 on the positive side and on the line L11 on the negative side. The setting change unit 160C, for example, determines the correction coefficient to 0.7 based on the line L10. For example, the setting change unit 160C sets the correction coefficient to 1.2 based on the line L11. The setting change unit 160C determines a value of the control signal represented on the first line 80A based on the correction coefficient, that is, shifts the first line 80A (step S25). Here, when the derivative value is greater than the fourth threshold in the positive direction, the correction coefficient decreases, and thus the setting change unit 160C shifts the first line (initial first line) 80A in the direction in which the primary pressure is reduced (a direction of an arrowed line D2 in FIG. 3). When the derivative value is larger than the fourth threshold in the negative direction, the correction coefficient increases, and thus the setting change unit 160C shifts the first line (initial first line) 80A in the direction in which the primary pressure is increased (a direction of an arrowed line D1 in FIG. 3).

That is, the setting change unit 160C shifts the first line (initial first line) 80A to the first line 80A1 or 80A2, for example, by multiplying a correction coefficient by a reference value for setting the control signal of the first line (initial first line) 80A.

After correcting the first lines 80A1 and 80A2, the setting change unit 160C checks whether or not the derivative value is not greater than the fifth threshold (step S26). When the derivative value is greater than the fifth threshold (step S26, No), the setting change unit 160C returns to the process at step S24 and sets the correction coefficient again. On the other hand, when the derivative value is not greater than the fifth threshold value (step S26, Yes), the setting change unit 160C terminates the correction mode, thereby ending the shifting of the first lines 80A1 and 80A2. That is, after entering the correction mode (S22: derivative value≥fourth threshold), the setting change unit 160C continues to shift the first lines 80A1 and 80A2 until the derivative value becomes equal to or less than the fifth threshold. After the termination of the correction mode, the setting change unit 160C gradually returns the control signal to a value corresponding to the second line 80B by gradually returning the correction coefficient (gain) to 1.0.

Figure 10:
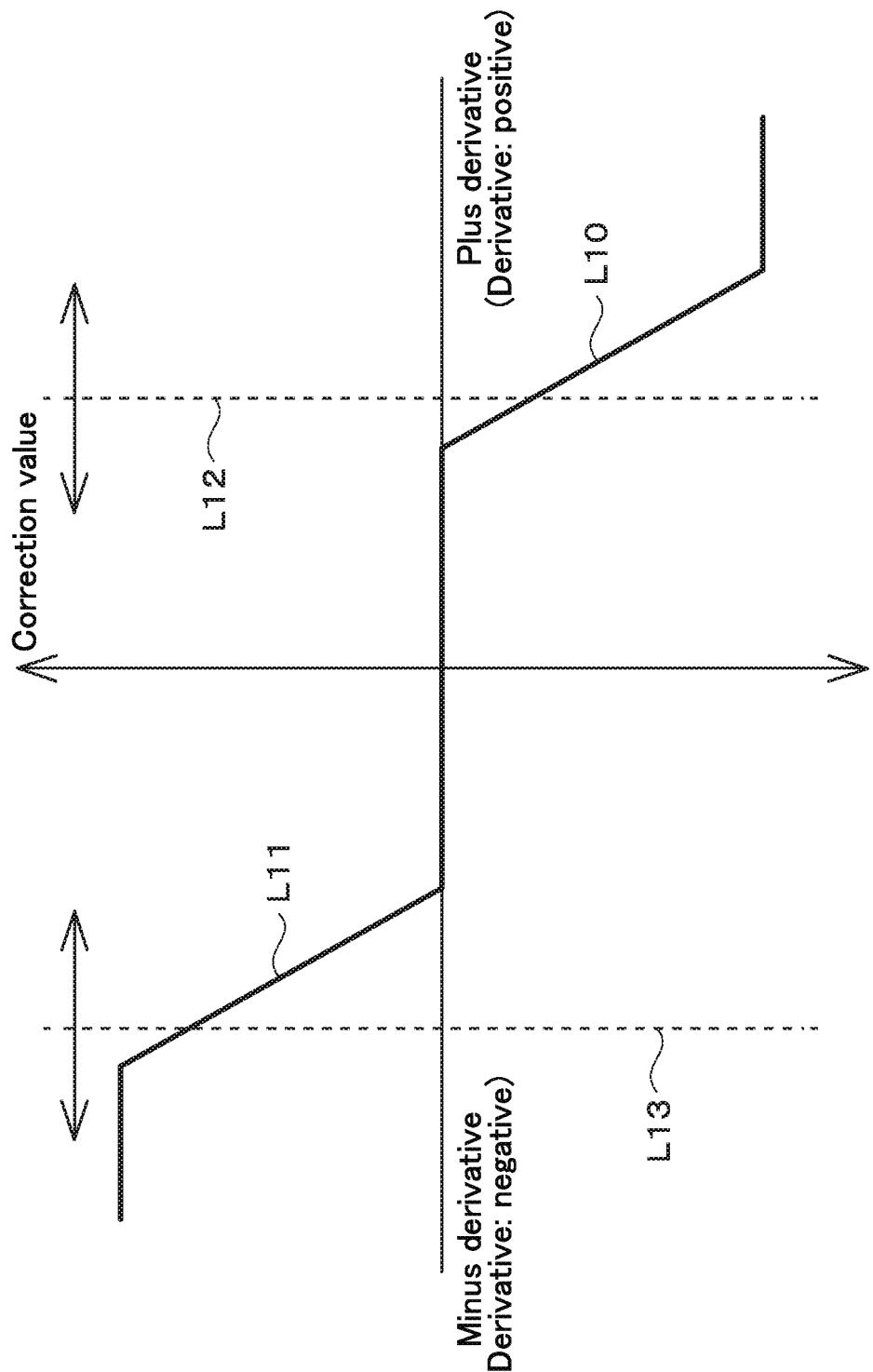
FIG. 10 is a view showing one example of a correction function defining a relationship between a derivative value and a correction coefficient according to the second embodiment.

As shown in FIG. 10, the fourth and fifth thresholds can be changed arbitrarily through operation or other means. Accordingly, when the line L12 representing the fourth threshold intersects with a sloping portion of the line L10, that is, when the fourth threshold is set closer to the sloping portion of the line L12, the correction coefficient immediately after entering the correction mode can be set according to the fourth threshold. It is also possible to set an upper limit of the correction coefficient by shifting a position of the line L13 representing the fifth threshold.

A specific example of a changing method in which the setting change unit 160C changes the setting of the instruction current value will be described.

The setting change unit 160C can change the setting of the instruction current value based on the correction coefficient (gain) set corresponding to the derivative value. The storage unit 160A stores a function that defines a relationship between a generated differential pressure and the correction coefficient (hereinafter referred to as a "correction function").

FIG. 10 shows an example of the correction function stored in the setting change unit 160C. As shown in FIG. 10, the correction coefficient decreases monotonically in accordance with increasing of the derivative value in the positive direction (a direction in which the negative value decreases and the positive value increases). The correction coefficient increases in accordance with increasing of the negative value of the derivative value and decreases in accordance with increasing of the positive value of the derivative value. For example, the correction coefficient is greater than 1 when the derivative value is 0. The correction coefficient is greater than 1 when the derivative value is negative, and increases linearly in accordance with increasing of negative value of the derivative value. When the derivative value is positive, the correction coefficient decreases linearly in accordance with increasing of positive value of the derivative value from a value greater than 1 to a value less than 1.

The setting change unit 160C calculates the correction coefficient by substituting, into the correction function, the derivative value calculated by the calculation unit 160B.

The setting change unit 160C changes the setting of the instruction current value based on the calculated correction coefficient. Specifically, by multiplying the calculated correction coefficient by the instruction current value of the control signal shown in the first line 80A, the control signal (instruction current value) to be output to the actuation valve 67 is changed. In this manner, the first line 80A is shifted.

In a case where the correction coefficient is 1, the instruction current value is not changed even when the setting change unit 160C multiplies the instruction current value by the correction coefficient, and thus the first line 80A is not shifted. In a case where the correction coefficient is less than 1, when the setting change unit 160C multiplies the instruction current value by the correction coefficient, the instruction current value decreases, and thus the first line 80A is shifted in a direction where the primary pressure to be output from the actuation valve 67 is reduced. That is, in FIG. 3, the first line 80A is shifted in the direction shown by the arrowed line D2. In a case where the correction coefficient exceeds 1, when the setting change unit 160C multiplies the instruction current value by the correction coefficient, the instruction current value is increased, and thus the first line 80A is shifted in the direction where the primary pressure to be output from the actuation valve 67 is increased. That is, in FIG. 3, the first line 80A is shifted in the direction shown by the arrowed line D2.

The changing method in which the setting change unit 160C changes the setting of the instruction current value is not limited to the method of using the correction coefficient described above. For example, the setting change unit 160C may be configured to change the setting value of the instruction current value by changing the anti-stall map according to the derivative value. In detail, a plurality of different anti-stall maps (anti-stall maps with different first lines 80A) corresponding to a plurality of different derivative values are stored in advance in the storage unit 160A, and the setting change unit 160C may select the anti-stall map corresponding to the generated differential pressure according to the derivative values and then may change the setting value of the instruction current value based on the first line 80A shown in the anti-stall map.

In the above-described embodiment, the actuation valve 67 is provided upstream of the operation valves 55 (delivery fluid passage 40). Alternatively, the actuation valve 67 may be provided at an intermediate portion of the fifth traveling fluid passage 45e, for example.

Figure 11:
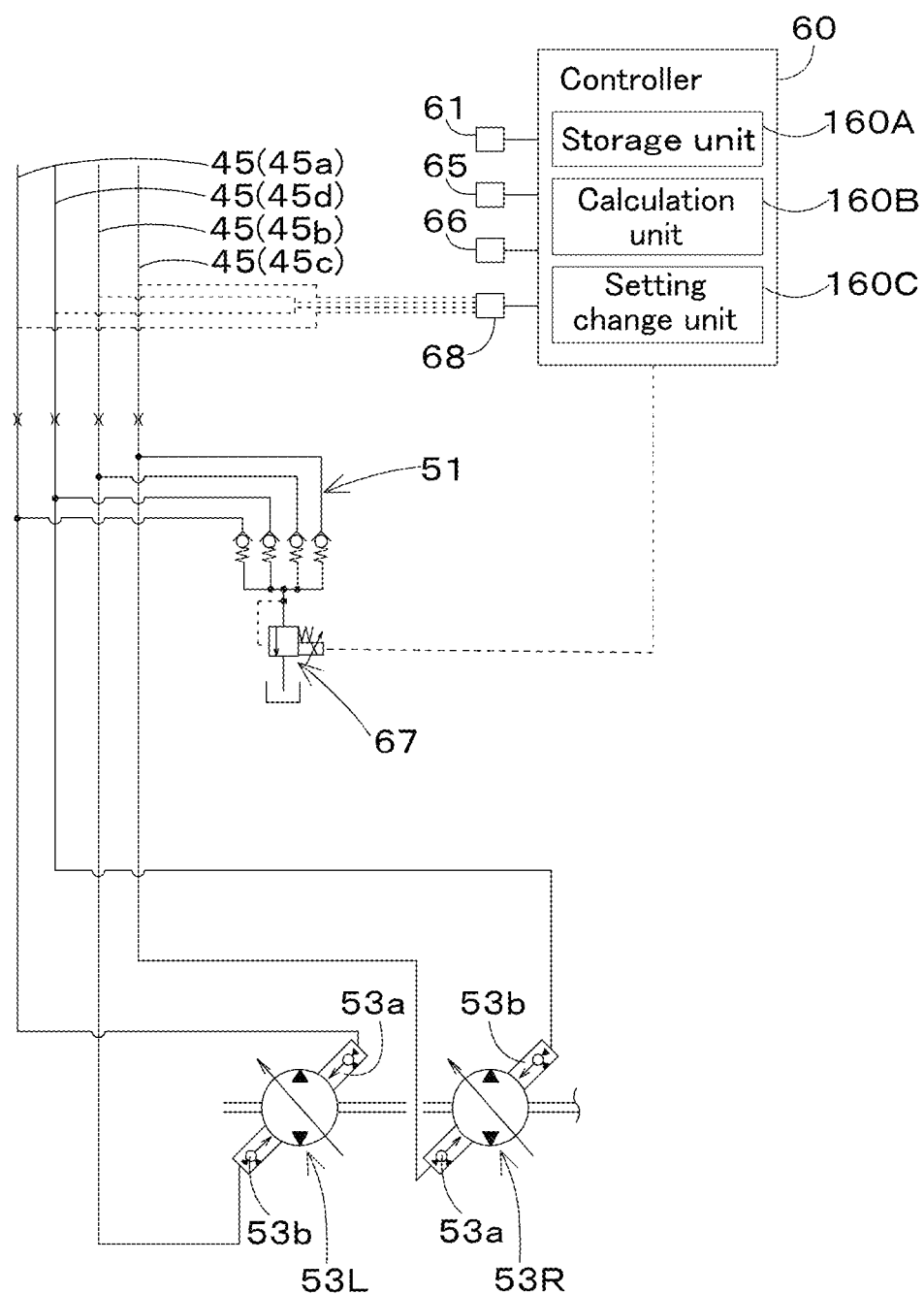
FIG. 11 is a view showing an example in which an actuation valve is disposed on a secondary port side of an operation valve according to the second embodiment.

Alternatively, as shown in FIG. 11, the actuation valve 67 may be disposed on the traveling fluid passage 45 that is connected to the traveling pumps (left traveling pump 53L and right traveling pump 53R). Specifically, fluid passages 51 may be branched from the respective first traveling fluid passage 45a, second traveling fluid passage 45b, third traveling fluid passage 45c, and fourth traveling fluid passage 45d, the actuation valves 67 such as variable relief valves or electromagnetic proportional valves may be disposed on the respective fluid passages 51. In this manner, opening degrees of the actuation valves 67 may be controlled according to the first control signal and the second control signal.

In the above-described embodiment, the traveling operation device 54 is a hydraulic operation device in which the operation valves 55 change pilot pressures acting on the traveling pumps (first traveling pump 53L and second traveling pump 53R). Alternatively, as shown in FIG. 7, the traveling operation device 54 may be an electrically-operable device.

Figure 12:
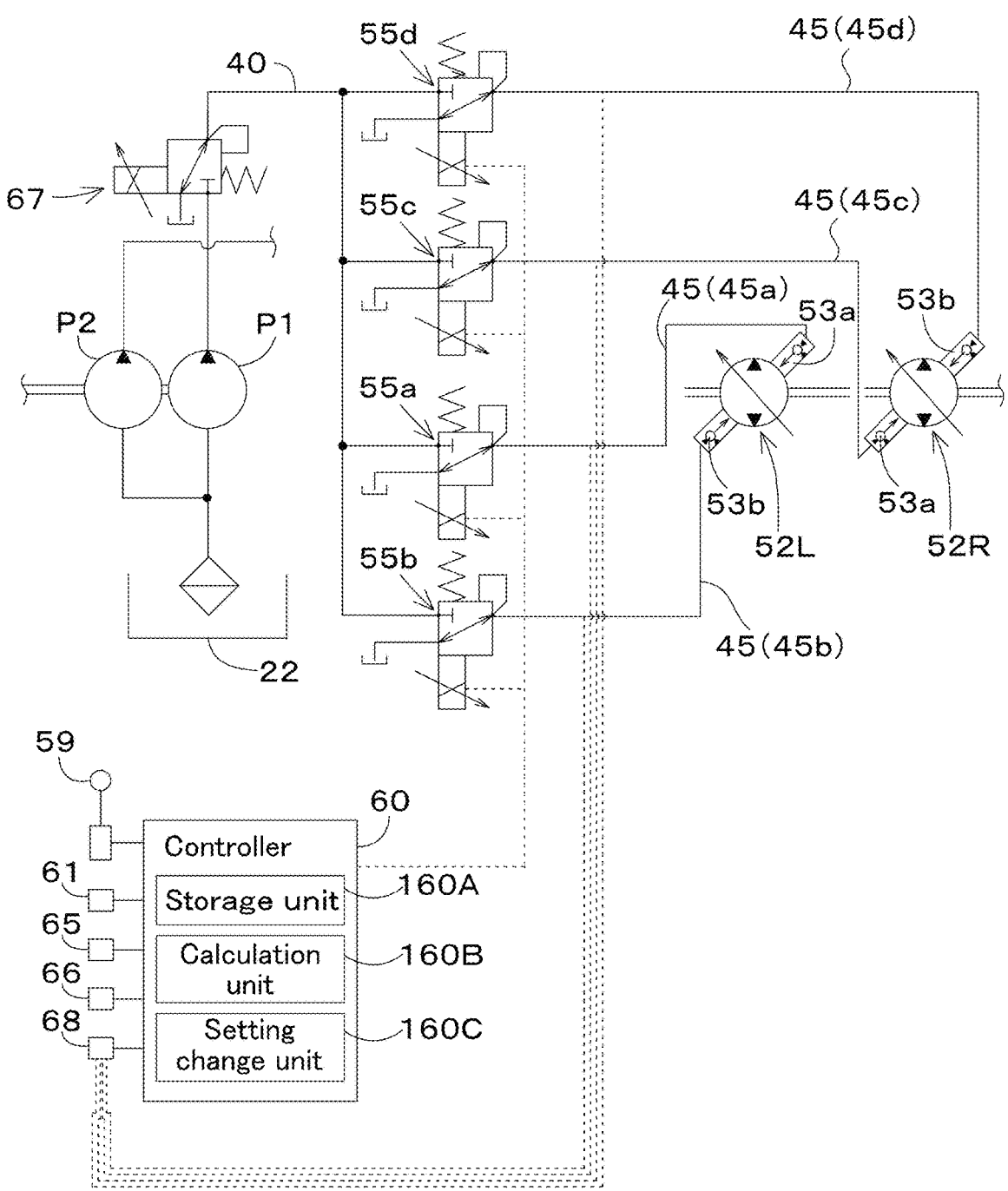
FIG. 12 is a view showing a modified example in which an operation device according to the second embodiment is replaced by an electrically-operable operation device such as a joystick.

As shown in FIG. 12, the traveling operation device 54 has the operation member 59 swingable in the lateral direction (that is, the machine width direction) or the fore-and-aft direction, and the operation valves 55 (that is, the operation valves 55A, 55B, 55C, and 55D) constituted of electromagnetic proportional valves. The controller 60 is connected to the operation detector configured to detect an operation amount and operational direction of the operation member 59. The controller 60 controls the operation valves 55 (that is, the operation valves 55A, 55B, 55C, and 55D) based on the operation amount and operational direction detected by the operation detector.

When the operation member 59 is operated forward (in the direction A1, see FIG. 8), the controller 60 outputs a control signal to the operation valves 55A and 55C to tilt the swash plates of first and second traveling pumps 53L and 53R in the respective directions for the normal rotation (forward traveling).

When the operation member 59 is operated backward (in the direction A2, see FIG. 8), the controller 60 outputs a control signal to the operation valves 55B and 55D to tilt the swash plates of first and second traveling pumps 53L and 53R in the respective directions for the reverse rotation (backward traveling).

When the operation member 59 is operated to the right (in the direction A3, see FIG. 8), the controller 60 outputs a control signal to the operation valves 55A and 55D to tilt the swash plate of first traveling pump 53L in the direction for the normal rotation and the swash plate of second traveling pump 53R in the direction for the reverse rotation.

When the operation member 59 is operated to the left (in the direction A4, see FIG. 8), the controller 60 outputs a control signal to the operation valves 55B and 55C to tilt the swash plate of first traveling pump 53L in the direction for the reverse rotation and the swash plate of second traveling pump 53R in the direction for the normal rotation.

The working machine 1 mentioned above includes the prime mover 32, the traveling pumps 53L and 53R configured to be driven by power of the prime mover 32 so as to deliver hydraulic fluid, the traveling motors 36L and 36R configured to be rotated by the hydraulic fluid delivered from the traveling pumps 53L and 53R, the operation valves 55 configured to change a pilot pressure of pilot fluid output therefrom to the traveling pumps 53L and 53R according to operation of the operation member 59, the actuation valve 67 configured to be activated according to a control signal so as to change the primary pressure that is the pilot pressure of the pilot fluid to be supplied to the operation valves 55, the rotation speed detection device 66 configured to detect an actual rotation speed of the prime mover 32, and the controller 60 configured or programmed to perform setting of the control signal to be output to the actuation valve 67. The controller 60 includes the calculation unit 160B configured or programmed to calculate a derivative representing a rate of change of the actual rotation speed per unit time, and the setting change unit 160C configured or programmed to change, based on the derivative calculated by the calculation unit 160B, the setting of the control signal to be output to the actuation valve 67.

According to this configuration, the controller 60 can use the setting change unit 60C to change the setting of the control signal to be output to the actuation valve 67 based on the derivative value representing a rate of change of the actual rotation speed with respect to time. Accordingly, the setting change unit 60C can change the primary pressure, which is a pilot pressure of the pilot fluid to be supplied by the actuation valve 67 to the operation valves 55, based on the derivative value. Through this changing, the working machine 1 is capable of preventing the work efficiency from being deteriorated due to excessive engine-speed dropping and preventing a feeling that a traveling force is reduced in recovering from the engine-speed dropping, even when a tracking ability of the actuation valve 67 (tracking ability of the secondary pressure to the primary pressure) is poor.

In addition, the working machine 1 includes the accelerator 65 operable to set the target rotation speed of the prime mover 32, and the storage unit 160A configured or programmed to store the first line 80A that represents the control signal to be set based to the actual rotation speed when a difference between the target rotation speed and the actual rotation speed is not smaller than a first threshold, and to store the second line 80B that represents the control signal larger than that represented by the first line 80A when the difference between the target rotation speed and the actual rotation speed is smaller than the first threshold. The setting change unit 160C is configured or programmed to change, based on the derivative, the control signal represented by the first line 80A so as to shift the first line 80A.

According to this configuration, in correspondence to the two cases: a case where a load applied to the prime mover 32 is low (a difference between the target rotation speed and the actual rotation speed is less than the first threshold), and a case where a load applied to the prime mover 32 is high (the difference between the target rotation speed and the actual rotation speed is not less than the first threshold), the setting change unit 60C can appropriately changes, based on the derivative value, the setting of the control signal to be output to the actuation valve 67.

In addition, the setting change unit 160 is configured or programmed to shift the first line 80A based on a correlation between the derivative and the fourth threshold.

According to this configuration, it becomes easy to set a direction and an amount of shifting of the first line 80A based on a relationship showing how the derivative value representing a rate of change of the actual rotation speed with respect to time is close to or far away from the fourth threshold.

The actuation valve 67 is a proportional solenoid valve having an opening degree increased in proportion to increase of an electric current value. The setting change unit 160C is configured or programmed to shift, when the derivative is larger in a positive direction than the fourth threshold, the first line 80A in a direction such as to reduce the primary pressure output from the actuation valve 67.

According to this configuration, when the derivative value is larger than the fourth threshold value in a positive direction, the setting change unit 60C shifts the first line 80A in a direction in which the primary pressure to be output from the actuation valve 67 is reduced, thereby suppressing the excessive engine-speed dropping and deterioration of the work efficiency.

In addition, the setting change unit 160C is configured or programmed to finish, when the derivative becomes not larger than the fifth threshold that is smaller than the fourth threshold, the shifting of the first line 80A.

According to this configuration, the setting change unit 60C can continue to shift the first line 80A until the derivative value becomes the fifth threshold value that is smaller than the fourth threshold value.

In addition, the setting change unit 160C is configured or programmed to gradually restore, when the shifting of the first line 80A is finished, the control signal to the value before the shifting of the first line 80A.

According to this configuration, the setting change unit 60C can gradually return the control signal to be output to the actuation valve 67 from the control signal set through the shifting of the first line 80A to the original first line 80A, thereby suppressing the sudden pressure fluctuation of the secondary pressure (primary pressure) at the termination of the shifting of the first line 80A.

In addition, the setting change unit 160C changes the setting of the control signal output to the actuation valve 67 based on the correction coefficient set corresponding to a value of the derivative.

According to this configuration, since the setting change unit 60C can change the setting of the control signal to be output to the actuation valve 67 with the correction coefficient set corresponding to a value of the derivative value, the setting of the control signal to be output to the actuation valve 67 corresponding to the value of the derivative value can be changed easily and appropriately.

In addition, the storage unit 160A stores the function defining the relationship between the derivative and the correction coefficient, and the setting change unit 160C calculates the correction coefficient by substituting the derivative calculated by the calculation unit 160A into the function.

According to this configuration, the setting change unit 60C can easily and accurately calculate the correction coefficient with a function that defines a relationship between the derivative value and the correction coefficient.

Third Embodiment

Figure 13:
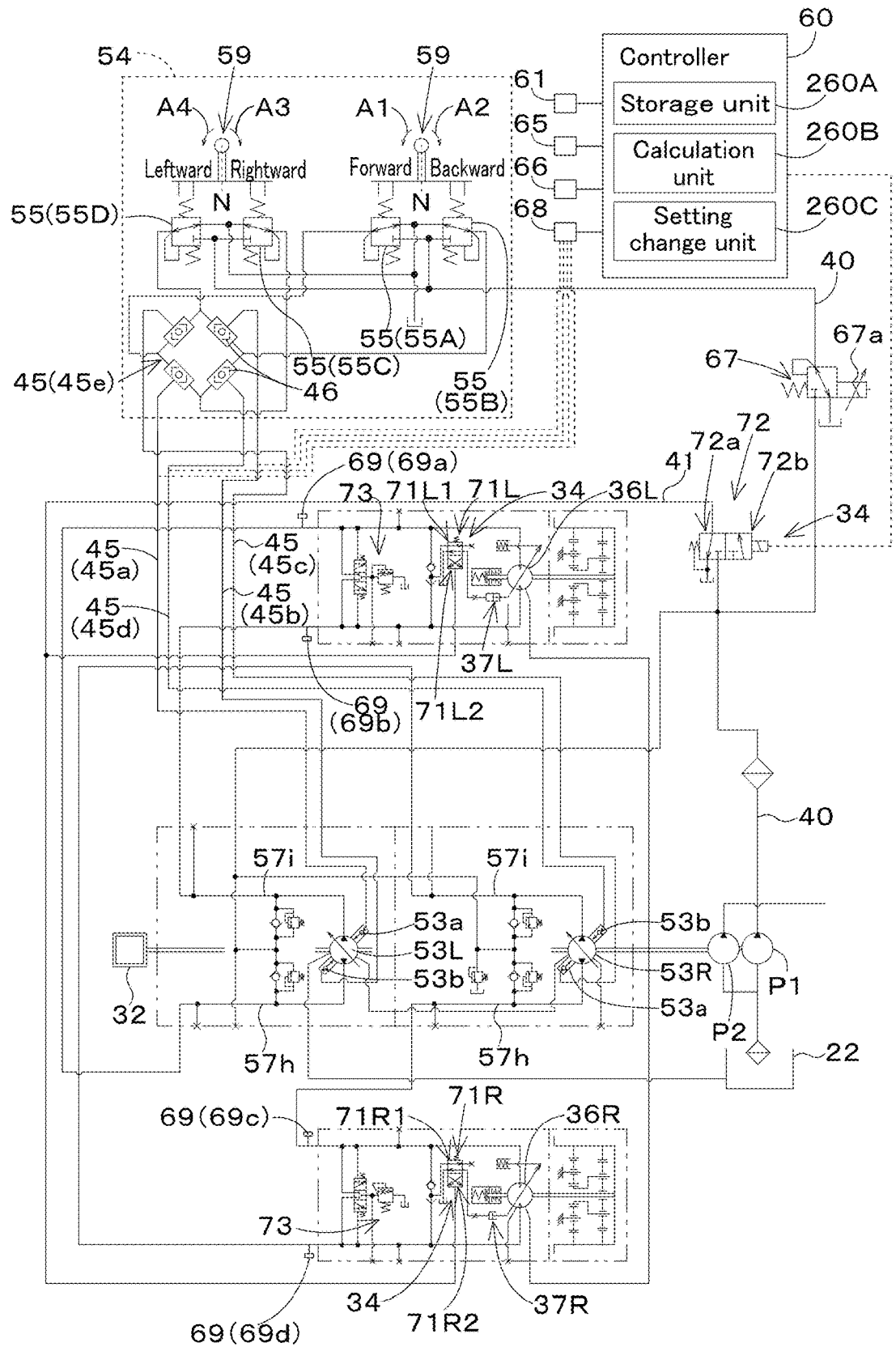
FIG. 13 is a view showing a hydraulic system (hydraulic circuit) for a working machine according to a third embodiment.

FIG. 13 shows another embodiment (third embodiment) of the working machine 1. The working machine 1 according to the first embodiment changes the primary pressure based on the primary pressure and the secondary pressure, and the working machine 1 according to the second embodiment changes the primary pressure based on a derivative value representing a rate of change of an actual rotation speed with respect to time, thereby preventing deterioration of work efficiency due to excessive engine-speed dropping and preventing a feeling that a traveling force is reduced in recovering from the engine-speed dropping. Contrarily, in the working machine 1 according to the third embodiment, the primary pressure is changed based on a traveling pressure to prevent a traveling force from decreasing in the high speed range while preventing the phenomenon in which an engine speed is remained high, thereby giving an operator a feeling that the working machine 1 is doing enough work.

The working machine 1 according to the third embodiment will be described focusing on configurations that differ from those of the first and second embodiments, and detailed description of the configurations common to the first and second embodiments will be omitted with the same reference numerals given thereto.

For convenience of explanation, a storage unit according to the second embodiment is hereinafter described with a reference numeral as "storage unit 260A," the calculation unit is described with a reference numeral as "calculation unit 260B," and the setting change unit is described with a reference numeral as "setting change unit 260C," as shown in FIG. 13. That is, the controller 60 according to the third embodiment is provided with a storage unit 260A, a calculation unit 260B, and a setting change unit 260C.

The storage unit 260A is a non-volatile memory. The calculation unit 260B and the setting change unit 260C are constituted of electrical/electronic circuits provided in the controller 60, computer programs stored in the controller 60, or the like.

The storage unit 260A stores a correspondence relationship (see FIG. 2) between the primary pressure and the control signal (instruction current value) to be output by the controller 60 to the actuation valve 67, as in the storage unit 60A according to the first embodiment and the storage unit 160A according to the second embodiment. Based on this correspondence relationship, the primary pressure is determined according to the control signal (instruction current value).

In the storage unit 260A, as in the storage unit 60A according to the first embodiment and the storage unit 160A according to the second embodiment, the setting line 80 is stored to determine the primary pressure (specifically, a target value of the primary pressure) based on an actual rotation speed of the prime mover 32.

In the third embodiment, the first line 80A is, as in the second embodiment, a line for determining a control signal (instruction current value) based on an actual rotation speed when a difference between the target rotation speed and the actual rotation speed of the prime mover 32 (dropping rotation speed) is not less than the first threshold.

Unlike the calculation unit 60B according to the first embodiment and the calculation unit 160B according to the second embodiment, the calculation unit 260B according to the third embodiment calculates a dropping rotation speed by subtracting the actual rotation speed from the target rotation speed based on the target rotation speed defined by the accelerator 65 and the actual rotation speed detected by the rotation speed detection device 66.

Unlike the setting change unit 60C according to the first embodiment and the setting change unit 160C according to the second embodiment, the setting change unit 260C according to the third embodiment changes the setting of the control signal (instruction current value) to be output to the actuation valve 67 based on the traveling pressure. The traveling pressure will be explained below.

As shown in FIG. 13, at least one pressure detection device 69 (hereinafter referred to as a "second pressure detection device 69") is disposed on at least one of the circulation fluid passage 57h and 57i that connect the respective traveling pumps (first traveling pump 53L and second traveling pump 53R) to the respective traveling motors (first traveling motor 36L and second traveling motor 36R). The at least one second pressure detection device 69 detects the pressure of hydraulic fluid flowing in the at least one of the circulation fluid passages 57h and 57i as the traveling pressure. The at least one second pressure detection device 69 is a pressure sensor or the like. A detection signal representing a value of the traveling pressure detected by the at least one second pressure detection device 69 is transmitted to the controller 60.

The at least one second pressure detection device 69 includes a pressure detection device 69a, a pressure detection device 69b, a pressure detection device 69c, and a pressure detection device 69d. The pressure detection device 69a is provided on the first port P11 side of the left traveling motor 36L in the circulation fluid passage 57h, and detects a traveling pump pressure on the first port P11 side as the first traveling pressure V1. The pressure detection device 69b is provided on the second port P12 side of the left traveling motor 36L in the circulation fluid passage 57h, and detects a traveling pump pressure on the second port P12 side as the second traveling pressure V2. The pressure detection device 69c is provided on the third port P13 side of the right traveling motor 36R in the circulation fluid passage 57i, and detects a traveling pump pressure on the third port P13 side as the third traveling pressure V3. The pressure detection device 69d is provided on the fourth port P14 side of the right traveling motor 36R in the circulation fluid passage 57i, and detects a traveling pump pressure on the fourth port P14 side as the fourth traveling pressure V4.

The setting change unit 260C changes the setting of the instruction current value based on, for example, the first to fourth traveling pressures (V1 to V4), which are the traveling pump pressures detected by a plurality of second pressure detection devices 69 disposed on the circulation fluid passages 57h and 57i. For example, the setting change unit 260C adopts, as the "traveling pressure," the highest one of a first differential pressure obtained by subtracting the second traveling pressure V2 from the first traveling pressure V1, a second differential pressure obtained by subtracting the first traveling pressure V1 from the second traveling pressure V2, a third differential pressure obtained by subtracting the fourth traveling pressure V4 from the third traveling pressure V3, and a fourth differential pressure obtained by subtracting the third traveling pressure V3 from the fourth traveling pressure V4, and then changes the setting of the instruction current value based on the employed traveling pressure (the highest one of the traveling pressure). The setting change unit 260C may adopt an average value of the first to fourth traveling pressures (V1 to V4) as the traveling pressure. In addition, among the plurality of traveling pressures (the first traveling pressure V1, the second traveling pressure V2, the third traveling pressure V3, and the fourth traveling pressure V4), an average of two of the traveling pressures may be adopted as the traveling pressure to be used for the anti-stall control, an average of three of the traveling pressures may be adopted as the traveling pressure to be used for the anti-stall control, and the configuration is not limited thereto. In the anti-stall control, a difference between at least two of the traveling pressures (first traveling pressure V1, second traveling pressure V2, third traveling pressure V3, and fourth traveling pressure V4) may be adopted as the traveling pressure to be used for the anti-stall control. That is, the differential pressure may be employed as the traveling pressure in the anti-stall control, or the traveling pressure itself may be employed, or the absolute value of the differential pressure may be employed.

The setting change unit 260C changes the setting of the control signal (instruction current value) to be output to the actuation valve 67 based on the traveling pressure. Specifically, the setting change unit 260C enters the correction mode when the traveling pressure becomes equal to or greater than a sixth threshold. In the correction mode, the setting change unit 260C shifts (corrects) the first line 80A.

In a case where the setting change unit 260C is not in the correction mode, the setting change unit 260C does not shift (correct) the first line 80A when the traveling pressure is less than the sixth threshold. After entering the correction mode, the setting change unit 260C terminates the correction mode to stop shifting the first line 80A when a release condition of the correction mode is satisfied. For example, in a case where the setting change unit 260C is in the correction mode, the setting change unit 260C terminates the correction mode when the traveling pressure becomes equal to or less than a seventh threshold. For convenience of explanation, the sixth threshold may be referred to as a "traveling pressure threshold" in the following description. In addition, the seventh threshold to be used for terminating the correction mode is a smaller value than the sixth threshold.

The shifting of the first line 80A by the setting change unit 260C is performed by changing the control signal indicated on the first line 80A. For example, the first line 80A is shifted upward by increasing the instruction current value HO, which is a control signal determined based on the actual rotation speed M10 (refer to the arrowed line D1 in FIG. 3). Alternatively, the first line 80A is shifted downward by decreasing the instruction current value HO, which is the control signal determined based on the actual rotation speed M10 (refer to the arrowed line D2 in FIG. 3).

In the present embodiment, the setting change unit 260C shifts the first line 80A in a direction in which the primary pressure to be output from the actuation valve 67 is increased (in which the instruction current value increases) when the traveling pressure becomes equal to or greater than the sixth threshold (traveling pressure threshold).

In FIG. 3, the first line 80A shifted in the direction in which the primary pressure increases is shown by the dashed-dotted line 80A1. That is, the setting change unit 160C shifts the initial first line 80A shown by a solid line to the first line 80A1 shown by the dashed-dotted line when the traveling pressure becomes equal to or greater than the sixth threshold (traveling pressure threshold).

As described above, in a case where the setting change unit 260C is in the correction mode, the first line 80A is shifted in a direction in which the primary pressure is increased as the traveling pressure is increased when the traveling pressure becomes equal to or greater than the sixth threshold (traveling pressure threshold). In this manner, horsepower consumptions of the traveling pumps 53L and 53R can be increased. By increasing the horsepower consumed by the traveling pumps 53L and 53R, the engine speed balance with a delivery flowrate of the traveling pumps can be lowered.

Accordingly, in a work involving an operation to open a traveling relief valve 73, such as soil pushing, delivery flowrates of the traveling pumps 53L and 53R (horsepower consumptions of the traveling pumps) are reduced due to an effect of swash plate characteristics of the traveling pumps 53L and 53R, thereby preventing a phenomenon in which the engine speed balanced with the flowrate becomes high. As a result, the traveling force at a high rotation speed level can be prevented from being reduced while preventing the phenomenon that the engine rotation speed remains at a high level, and it is possible to give an operator a feeling as if the working machine is doing enough work.

Figure 14:
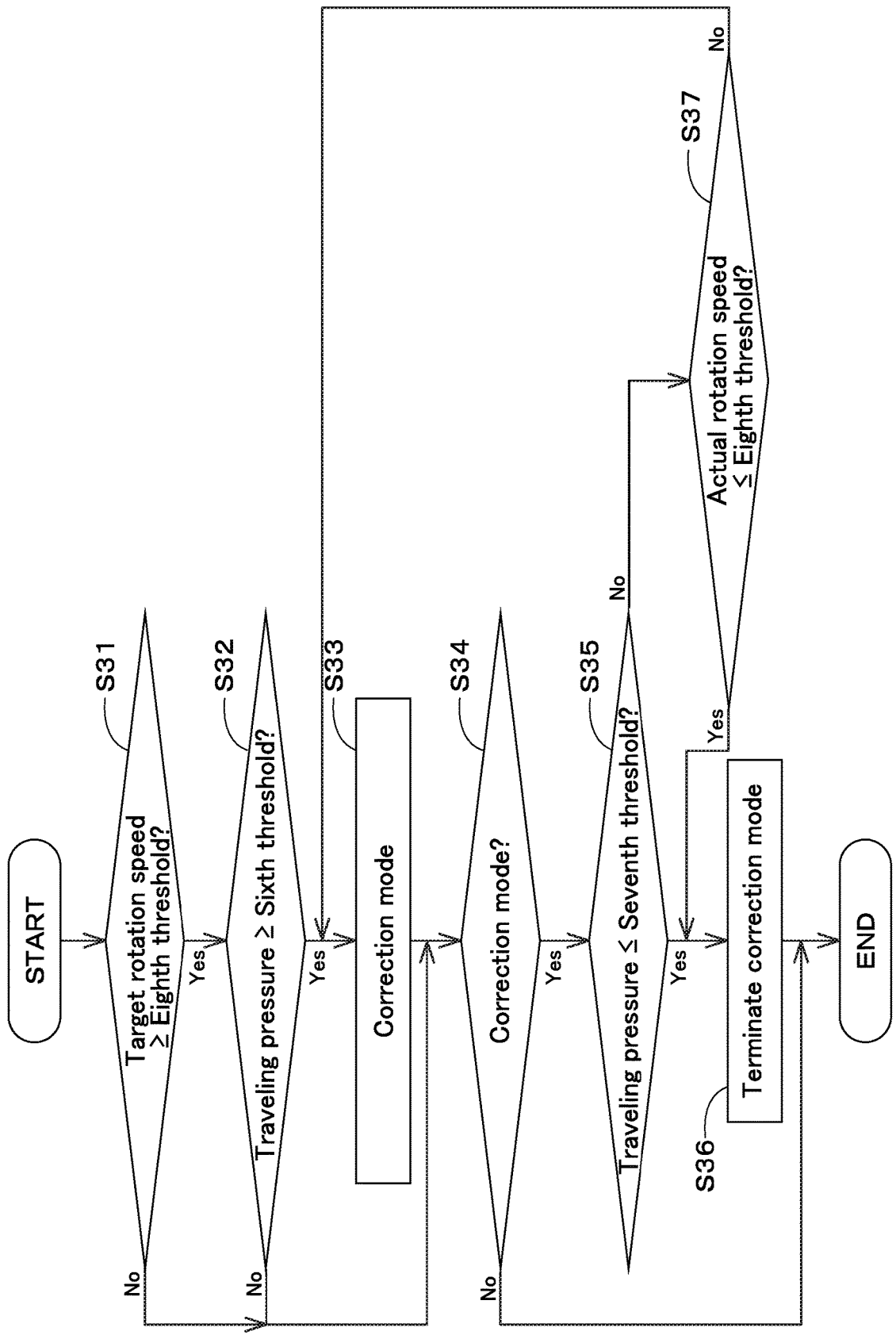
FIG. 14 is an operation flow of shifting a first line in a controller according to the third embodiment.

FIG. 14 is an operation flow showing a flow of an operation in which the controller 60 shifts the first line 80A according to the third embodiment. The calculation unit 260B calculates the dropping rotation speed by subtracting the actual rotation speed from the target rotation speed based on the target rotation speed set by the accelerator 65 and the actual rotation speed detected by the rotation speed detection device 66, and when the dropping rotation speed is less than the first threshold, the setting change unit 260C sets the control signal (instruction current value) based on the second line 80B. When the dropping rotation speed is not less than the first threshold, the setting change unit 260C sets the control signal (instruction current value) based on the first line 80A.

As shown in FIG. 14, the setting change unit 260C judges whether or not the target rotation speed of the prime mover 32 is not less than an eighth threshold (step S31). When the target rotation speed of the prime mover 32 is not less than the eighth threshold, that is, when the target rotation speed of the prime mover 32 is set relatively high, the setting change unit 260C refers to the traveling pressure and judges whether or not the referred-to traveling pressure is not less than the sixth threshold (traveling pressure threshold) (step S32). When the traveling pressure is not less than the sixth threshold (traveling pressure threshold), the setting change unit 260C enters the correction mode (step S33). In the correction mode, the setting change unit 260C sets the first line 80A1, for example, by shifting the first line (initial first line) 80A in the direction in which the primary pressure is increased (a direction of the arrowed line D1 in FIG. 3) based on the traveling pressure and the correction coefficient shown in FIG. 15. In this manner, the setting change unit 260C sets the control signal (instruction current value) based on the set (shifted) first line 80A1.

The setting change unit 260C judges whether or not it is in the correction mode (step S34). When the setting change unit 260C is in the correction mode (step S34, Yes), the setting change unit 260C judges whether the traveling pressure is equal to or less than the seventh threshold (step S35). When the traveling pressure is equal to or less than the seventh threshold (step S35, Yes), the setting change unit 260C terminates the correction mode (step S36). In addition, the setting change unit 260C judges whether the actual rotation speed is equal to or less than the eighth threshold (step S37). When the actual rotation speed is not greater than the eighth threshold (step S37, Yes), the correction mode is terminated (step S36). After the termination of the correction mode, the setting change unit 260C gradually returns the control signal to a value corresponding to the first line 80A or the second line 80B by gradually returning the correction coefficient (gain) to 1.0. As shown in FIG. 14, when the actual rotation speed is not less than the eighth threshold (step S37, No), the setting change unit 260C returns the process to step S33 to continue the correction mode. In other words, when the traveling pressure is not less than the seventh threshold, the setting change unit 260C can return the process to step S33 to continue the correction mode.

That is, the setting change unit 260C enters the correction mode when the traveling pressure is not less than the sixth threshold (traveling pressure threshold), and in the correction mode, the setting change unit 260C continues the setting (shifting) of the second line 80B based on the correction coefficient corresponding to the traveling pressure. And, when the traveling pressure becomes not greater than the seventh threshold, the setting change unit 260C can terminate the correction mode, and gradually returns the control signal to the state before the correction.

The following is a specific example of the changing method in which the setting change unit 260C changes the setting of the control signal (instruction current value) to be output to the actuation valve 67.

The setting change unit 260C is capable of changing the setting of the instruction current value based on the correction coefficient (gain) determined corresponding to a value of the traveling pressure. The storage unit 260A stores a function that defines a relationship between the traveling pressure and the correction coefficient.

Figure 15:
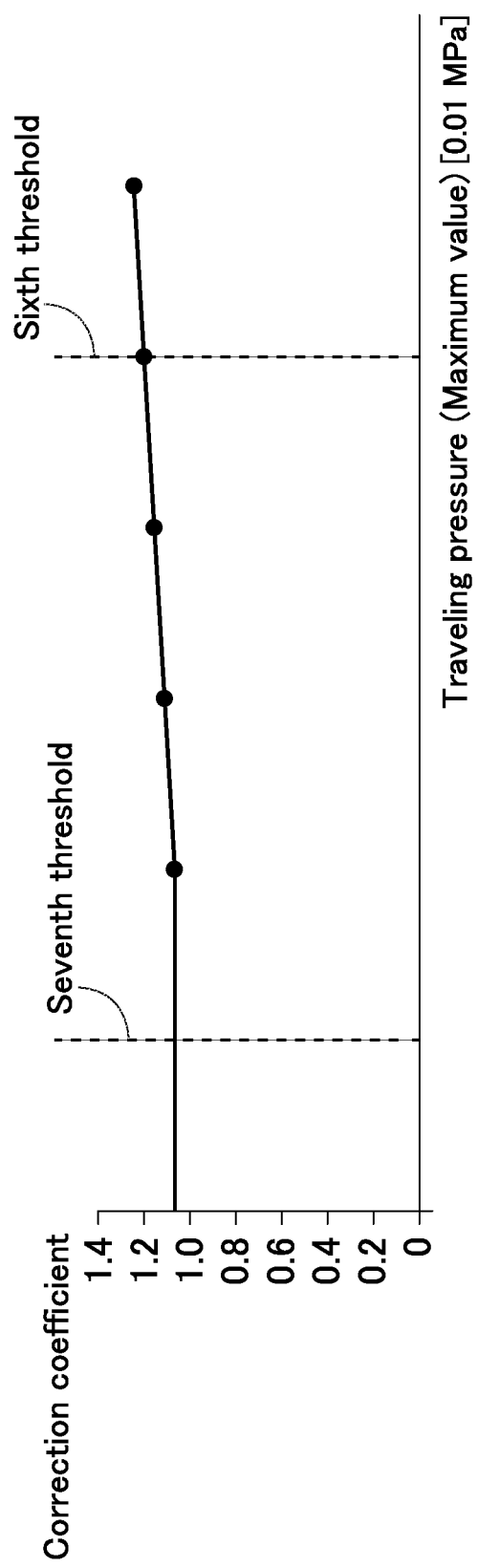
FIG. 15 is a view showing one example of a correction function defining a relationship between a traveling pressure and a correction coefficient according to the third embodiment.

FIG. 15 shows an example of the correction function stored in the storage unit 260A. As shown in FIG. 15, the correction coefficient increases as the traveling pressure increases. In FIG. 15, the traveling pressure shown on the horizontal axis is the maximum value of the traveling pressure (the maximum one among the pressures of the first to fourth traveling pressures (V1 to V4)).

The setting change unit 260C calculates a correction coefficient by substituting the traveling pressure detected by the second pressure detection device 69 into the correction function. For example, in a case of using the correction function shown in FIG. 15, the correction coefficient is calculated as 1.2 when the traveling pressure detected by the second pressure detection device 69 is +36 MPa (corresponding to a scale of +3600 on the horizontal axis).

As shown in FIG. 15, the setting change unit 260C sets a value exceeding 1 as the correction coefficient. In detail, the setting change unit 260C determines the correction coefficient to a value exceeding 1 when the traveling pressure is not less than a predetermined pressure. That is, the correction coefficient is not set when the traveling pressure is less than the predetermined pressure. In the example shown in FIG. 15, the correction coefficient is determined to a value exceeding 1 when the traveling pressure is 30 MPa or higher, and the correction coefficient is not determined when the traveling pressure is less than 30 MPa.

A predetermined pressure of the traveling pressure at which the correction coefficient is determined can be the same as the sixth threshold (traveling pressure threshold), for example. Accordingly, the setting change unit 260C can set a value exceeding 1 as the correction coefficient when the traveling pressure is not less than the sixth threshold (traveling pressure threshold).

The setting change unit 260C changes the setting of the control signal to be output to the actuation valve 67 based on the calculated correction coefficient. Specifically, the setting change unit 260C changes the instruction current value, which is the control signal to be output to the actuation valve 67, by multiplying the calculated correction coefficient by the instruction current value of the control signal shown in the first line 80A. In this manner, the setting change unit 260C shifts the first line 80A.

Since the correction coefficient is determined to a value exceeding 1, the instruction current value is increased when the instruction current value is multiplied by the correction coefficient, and the first line 80A is shifted in a direction in which the primary pressure to be output from the actuation valve 67 is increased. That is, in FIG. 3, the first line 80A is shifted in the direction shown by the arrowed line D1. In this manner, when a rotation speed of the prime mover 32 is high and the traveling pressure is high (not less than) the predetermined pressure), the setting change unit 260C changes the setting of the instruction current value with use of a correction coefficient exceeding 1, so that the instruction current value is changed in the direction in which the primary pressure to be output from the actuation valve 67 is increased.

The changing method in which the setting change unit 260C changes the setting of the control signal (instruction current value) to be output to the actuation valve 67 is not limited to the above-mentioned method using the correction coefficient. For example, the setting change unit 260C may configured to change the anti-stall map according to the traveling pressure to change the setting value of the instruction current value. In detail, a plurality of different anti-stall maps (anti-stall maps with different first lines 80A) corresponding to a plurality of different traveling pressures may be stored in the memory 260A in advance, and the setting change unit 260C may select the anti-stall map corresponding to the generated differential pressure according to the traveling pressures and then may change the setting value of the instruction current value based on the first line 80A shown in the anti-stall map.

In the above-described embodiment, the setting change unit 260C, in the correction mode, shifts the first line 80A in a direction in which the primary pressure is increased when the traveling pressure becomes equal to or greater than the sixth threshold (traveling pressure threshold); however, as shown in FIG. 3, the first line 80A may be shifted in a direction in which the primary pressure is reduced. That is, the setting change unit 260C can reduce outputs of the traveling pumps 53L and 53R by lowering the first line 80A to the first line 80A2 as the traveling pressure increases, thereby preventing the engine stalling.

In the above-described embodiment, the actuation valve 67 was provided upstream of the operation valves 55 (delivery fluid passage 40). Alternatively, the actuation valve 67 may be provided on an intermediate portion of the fifth traveling fluid passage 45e, for example.

Figure 16:
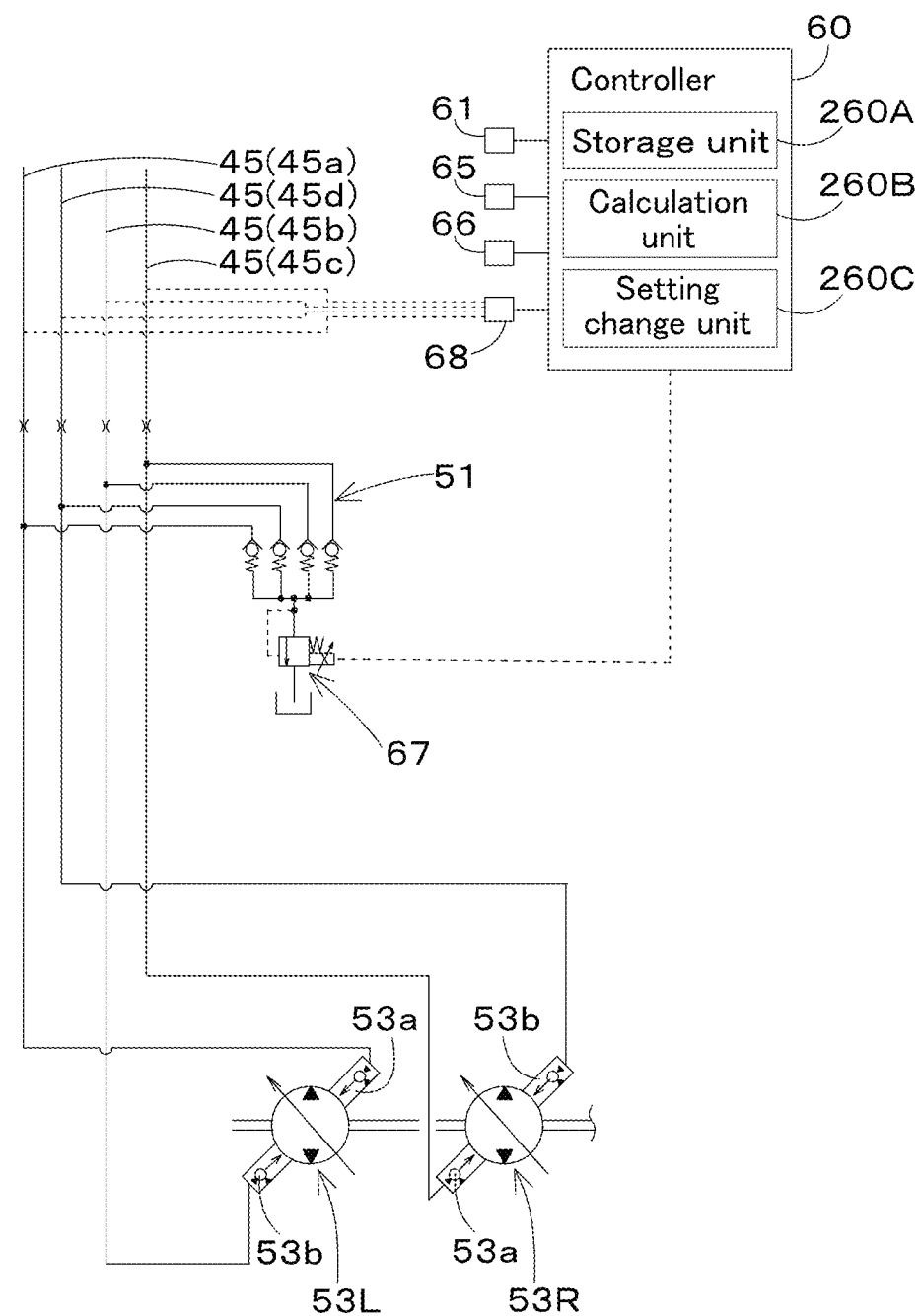
FIG. 16 is a view showing an example in which an actuation valve is disposed on a secondary port side of an operation valve according to the third embodiment.

Alternatively, as shown in FIG. 16, the actuation valve 67 may be disposed in the traveling fluid passages 45 that is connected to the traveling pumps (left traveling pump 53L and right traveling pump 53R). Specifically, fluid passages 51 may be branched from the respective first traveling fluid passage 45a, second traveling fluid passage 45b, third traveling fluid passage 45c, and fourth traveling fluid passage 45d, the actuation valves 67 such as variable relief valves or electromagnetic proportional valves may be disposed on the respective fluid passages 51. In this manner, opening degrees of the actuation valves 67 may be controlled according to the first control signal and the second control signal.

Figure 17:
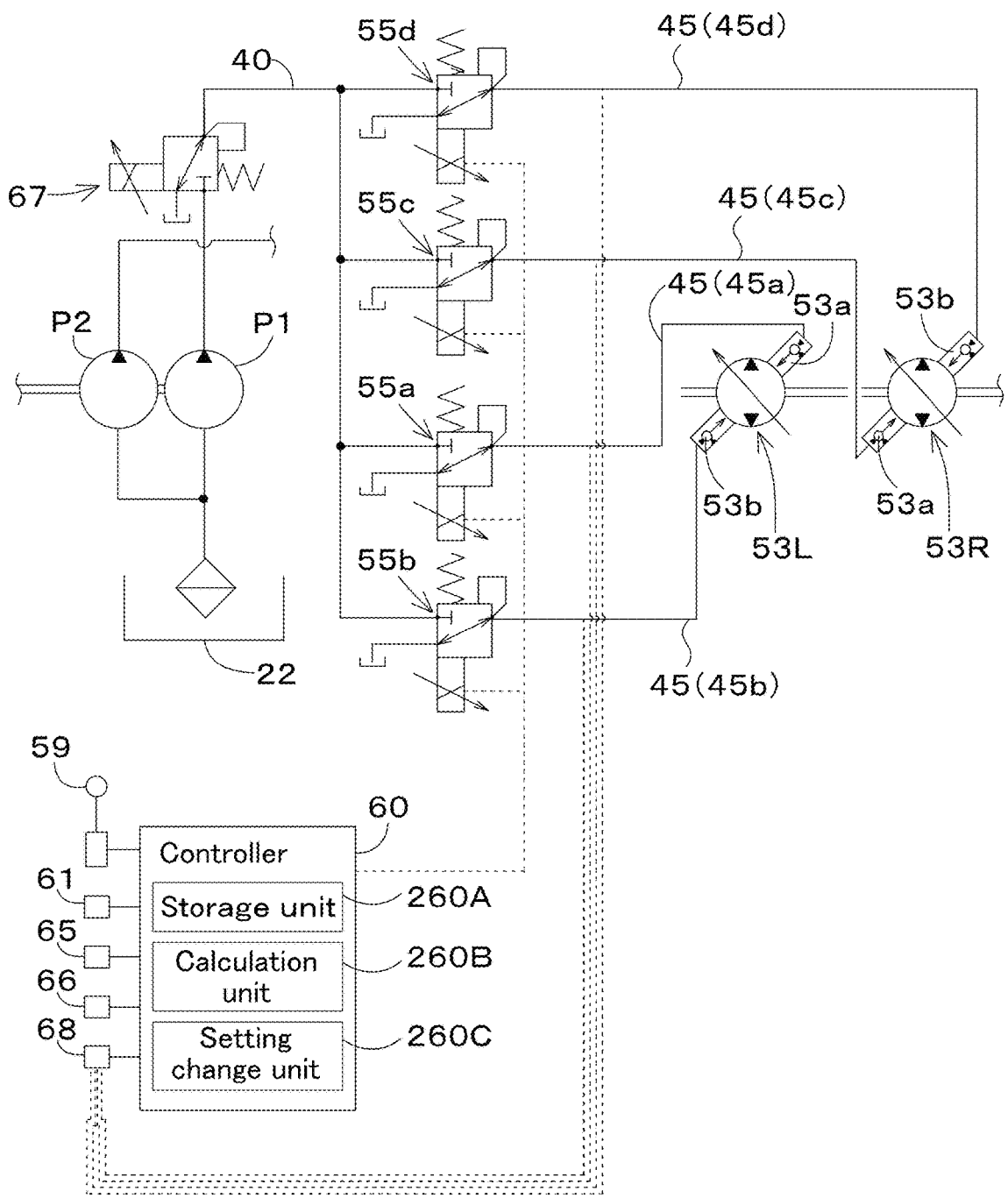
FIG. 17 is a view showing a modified example in which an operation device according to the third embodiment is replaced by an electrically-operable operation device such as a joystick.

In the above-described embodiment, the traveling operation device 54 employs a hydraulic operation device in which the operation valves 55 change pilot pressures acting on the traveling pumps (first traveling pump 53L and second traveling pump 53R), but as shown in FIG. 17, the traveling operation device 54 may be an electrically-operable device.

As shown in FIG. 17, the traveling operation device 54 has the operation member 59 swingable in the lateral direction (that is, the machine width direction) or the fore-and-aft direction, and the operation valves 55 (that is, the operation valves 55A, 55B, 55C, and 55D) constituted of electromagnetic proportional valves. The controller 60 is connected to the operation detector configured to detect an operation amount and operational direction of the operation member 59. The controller 60 controls the operation valves 55 (that is, the operation valves 55A, 55B, 55C, and 55D) based on the operation amount and operational direction detected by the operation detector.

When the operation member 59 is operated forward (in the direction A1, see FIG. 13), the controller 60 outputs a control signal to the operation valves 55A and 55C to tilt the swash plates of first and second traveling pumps 53L and 53R in the respective directions for the normal rotation (forward traveling).

When the operation member 59 is operated backward (in the direction A2, see FIG. 13), the controller 60 outputs a control signal to the operation valves 55B and 55D to tilt the swash plates of first and second traveling pumps 53L and 53R in the respective directions for the reverse rotation (backward traveling).

When the operation member 59 is operated to the right (in the direction A3, see FIG. 13), the controller 60 outputs a control signal to the operation valves 55A and 55D to tilt the swash plate of first traveling pump 53L in the direction for the normal rotation and the swash plate of second traveling pump 53R in the direction for the reverse rotation.

When the operation member 59 is operated to the left (in the direction A4, see FIG. 13), the controller 60 outputs a control signal to the operation valves 55B and 55C to tilt the swash plate of first traveling pump 53L in the direction for the reverse rotation and the swash plate of second traveling pump 53R in the direction for the normal rotation.

As described above, the working machine 1 includes the prime mover 32, the traveling pumps 53L and 53R configured to be driven by power of the prime mover 32 so as to deliver hydraulic fluid, the traveling motors 36L and 36R configured to be rotated by the hydraulic fluid delivered from the traveling pumps 53L and 53R, the operation valves 55 configured to change a pilot pressure of pilot fluid output therefrom to the traveling pumps 53L and 53R according to operation of the operation member 59, the actuation valve 67 configured to be activated according to the control signal so as to change the primary pressure that is the pilot pressure of the pilot fluid to be supplied to the operation valves 55, the controller 60 configured and programmed to perform setting of the control signal to be output to the actuation valve 67, the circulation fluid passages 57h and 57i fluidly connecting the traveling pumps 53L and 53R to the traveling motors 36L and 36R, and the pressure detection device (second pressure detection device) 69 configured to detect the traveling pressure that is a pressure of the hydraulic fluid in the circulation fluid passages 57h and 57i. The controller 60 includes the setting change unit 260C configured or programmed to change, based on the traveling pressure, the setting of the control signal to be output to the actuation valve 67.

According to this configuration, the controller 60 can use the setting change unit 260C to change the setting of the control signal to be output to the actuation valve 67 based on the traveling pressure. Accordingly, the setting change unit 260C is capable of changing the primary pressure, which is a pilot pressure of the pilot fluid to be supplied by the actuation valve 67 to the operation valves 55, based on the traveling pressure. When the setting change unit 260C changes the primary pressure, the working machine 1 can prevent a traveling force from decreasing in the high speed range while preventing the phenomenon in which an engine speed is remained high, thereby giving an operator a feeling that the working machine 1 is doing enough work.

The working machine 1 includes the accelerator 65 operable to set the target rotation speed of the prime mover 32, the rotation speed detection device 66 configured to detect an actual rotation speed of the prime mover 32, and the storage unit 260A configured or programmed to store the first line 80A that represents the control signal to be set based to the actual rotation speed when a difference between the target rotation speed and the actual rotation speed is not smaller than the first threshold, and to store the second line 80B that represents the control signal larger than that represented by the first line 80A when the difference between the target rotation speed and the actual rotation speed is smaller than the first threshold. The setting change unit 260C is configured or programmed to change, based on the traveling pressure, the control signal represented by the first line 80A so as to shift the first line 80A.

According to this configuration, in correspondence to two cases: one case in which a load applied to the prime mover 32 is low (a difference between the target rotation speed and the actual rotation speed is less than the first threshold) and another case in which the load applied to the prime mover 32 is high (the difference between the target rotation speed and the actual rotation speed is not less than the first threshold), the setting changing section 260C appropriately changes, based on the traveling pressure, the setting of the control signal to be output to the actuation valve 67.

The actuation valve 67 is a proportional solenoid valve having an opening degree increased in proportion to increase of an electric current value, and the setting change unit 260C is configured or programmed to shift, when the traveling pressure becomes not smaller than the sixth threshold, the first line 80A in a direction such as to increase the primary pressure output from the actuation valve 67.

According to this configuration, when the traveling pressure becomes equal to or greater than the sixth threshold, the setting change unit 260C can increase the horsepower consumption of the traveling pumps 53L and 53R by shifting the first line in a direction in which the primary pressure to be output from the actuation valve 67 is increased. That is, by increasing the horsepower consumption of the traveling pumps 53L and 53R, the engine rotation speed balanced with the delivery flowrates of the traveling pumps 53L and 53R can be lowered. As a result, the working machine 1 can prevent a traveling force from decreasing in the high speed range while preventing the phenomenon in which an engine speed is remained high, thereby giving an operator a feeling that the working machine 1 is doing enough work.

The actuation valve 67 is a proportional solenoid valve having an opening degree increased in proportion to increase of an electric current value. The setting change unit 260C is configured or programmed to shift, when the traveling pressure becomes not smaller than the sixth threshold, the first line in a such as to reduce the primary pressure output from the actuation valve 67.

According to this configuration, the working machine 1 can reduce the outputs of the traveling pumps 53L and 53R and prevent the engine stalling.

In addition, the setting change unit 260C is configured or programmed to finish, when the traveling pressure becomes not larger than the seventh threshold that is smaller than the sixth threshold, the shifting of the first line.

According to this configuration, the setting change unit 260C can continue to shift the first line until the traveling pressure becomes the seventh threshold that is smaller than the sixth threshold.

In addition, the setting change unit 260C is configured or programmed to gradually restore, when the shifting of the first line is finished, the control signal to the value before the shifting of the first line.

According to this configuration, the setting change unit 260C can gradually return the control signal to be output to the actuation valve 67 from the control signal set through the shifting of the first line 80A to the original first line 80A, thereby suppressing the sudden pressure fluctuation of the secondary pressure (primary pressure) at the termination of the shifting of the first line 80A.

The setting change unit 260C changes the setting of the control signal output to the actuation valve 67 based on the correction coefficient set corresponding to a value of the traveling pressure.

According to this configuration, since the setting change unit 260C can change the setting of the control signal to be output to the actuation valve 67 with the correction coefficient set corresponding to a value of the traveling pressure, the setting of the control signal to be output to the actuation valve 67 corresponding to the value of the traveling pressure can be changed easily and appropriately.

The storage unit 260A stores the function defining the relationship between the traveling pressure and the correction coefficient, and the setting change unit 260C calculates the correction coefficient by substituting the traveling pressure detected by the pressure detection device (second pressure detection device) 69 into the function.

According to this configuration, the setting change unit 260C can easily and accurately calculate the correction coefficient with a function that defines a relationship between the traveling pressure and the correction coefficient.

In the above description, the embodiment of the present invention has been explained. However, all the features of the embodiment disclosed in this application should be considered just as examples, and the embodiment does not restrict the present invention accordingly. A scope of the present invention is shown not in the above-described embodiment but in claims, and is intended to include all modifications within and equivalent to a scope of the claims.

What is claimed is:

1. A working machine comprising:
    a prime mover;
    a traveling pump configured to be driven by power of the prime mover so as to deliver hydraulic fluid;
    a traveling motor configured to be rotated by the hydraulic fluid delivered from the traveling pump;
    an operation valve configured to change a pilot pressure of pilot fluid output therefrom to the traveling pump according to operation of an operation member;
    an actuation valve configured to be activated according to a control signal so as to change a primary pressure that is the pilot pressure of the pilot fluid to be supplied to the operation valve;
    a controller configured or programmed to perform setting of the control signal to be output to the actuation valve; and
    a pressure detection device configured to detect a secondary pressure that is the pilot pressure output from the operation valve, wherein
    the controller includes
        a setting change unit configured or programmed to change, based on the primary pressure and the secondary pressure, the setting of the control signal to be output to the actuation valve.

2. The working machine according to claim 1, wherein the controller includes
    a calculation unit configured or programmed to calculate a differential pressure between the secondary pressure and a target pressure of the primary pressure determined in correspondence to the control signal.

3. The working machine according to claim 2, wherein the controller includes
    a storage unit configured or programmed to store a correlation between the control signal and the target pressure, and
    when the control signal is output to the actuation valve, the calculation unit is configured or programmed
        to use the storage unit so as to refer to the target pressure corresponding to the output control signal, and to calculate the differential pressure between the referred-to target pressure and the secondary pressure.

4. The working machine according to claim 3, further comprising:
an accelerator operable to set a target rotation speed of the prime mover; and
a rotation speed detection device configured to detect an actual rotation speed of the prime mover, wherein
the storage unit is configured or programmed
to store a first line that represents the control signal corresponding to the target pressure to be set based to the actual rotation speed when a difference between the target rotation speed and the actual rotation speed is not smaller than a first threshold and the differential pressure is not larger than a second threshold, and
to store a second line that represents the control signal corresponding to the target pressure to be set based on the actual rotation speed when the difference between the target rotation speed and the actual rotation speed is smaller than the first threshold, and
the setting change unit is configured or programmed
to change, when the differential pressure becomes larger than the second threshold, the control signal represented by the first line so as to shift the first line.

5. The working machine according to claim 4, wherein
the setting change unit is configured or programmed
to finish, when the differential pressure becomes not larger than a third threshold that is smaller than the second threshold, the shifting of the first line.

6. The working machine according to claim 5, wherein
the setting change unit is configured or programmed
to restore, when the shifting of the first line is finished, the control signal to a value before the shifting of the first line.

7. A working machine comprising:
a prime mover;
a traveling pump configured to be driven by power of the prime mover so as to deliver hydraulic fluid;
a traveling motor configured to be rotated by the hydraulic fluid delivered from the traveling pump;
an operation valve configured to change a pilot pressure of pilot fluid output therefrom to the traveling pump according to operation of an operation member;
an actuation valve configured to be activated according to a control signal so as to change a primary pressure that is the pilot pressure of the pilot fluid to be supplied to the operation valve;
a rotation speed detection device configured to detect an actual rotation speed of the prime mover; and
a controller configured or programmed to perform setting of the control signal to be output to the actuation valve, wherein
the controller includes
a calculation unit configured or programmed to calculate a derivative representing a rate of change of the actual rotation speed per unit time, and
a setting change unit configured or programmed to change, based on the derivative calculated by the calculation unit, the setting of the control signal to be output to the actuation valve.

8. The working machine according to claim 7, further comprising:
an accelerator operable to set a target rotation speed of the prime mover; and
a storage unit configured or programmed
to store a first line that represents the control signal to be set based to the actual rotation speed when a difference between the target rotation speed and the actual rotation speed is not smaller than a first threshold, and
to store a second line that represents the control signal larger than that represented by the first line when the difference between the target rotation speed and the actual rotation speed is smaller than the first threshold, wherein
the setting change unit is configured or programmed
to change, based on the derivative, the control signal represented by the first line so as to shift the first line.

9. The working machine according to claim 8, wherein
the setting change unit is configured or programmed
to shift the first line based on a correlation between the derivative and a fourth threshold.

10. The working machine according to claim 8, wherein
the actuation valve is a proportional solenoid valve having an opening degree increased in proportion to increase of an electric current value, and
the setting change unit is configured or programmed
to shift, when the derivative is larger in a positive direction than a fourth threshold, the first line in a direction such as to reduce the primary pressure output from the actuation valve.

11. The working machine according to claim 9, wherein
the actuation valve is a proportional solenoid valve having an opening degree increased in proportion to increase of an electric current value, and
the setting change unit is configured or programmed
to shift, when the derivative is larger in a positive direction than the fourth threshold, the first line in a direction such as to reduce the primary pressure output from the actuation valve.

12. The working machine according to claim 9, wherein
the setting change unit is configured or programmed
to finish, when the derivative becomes not larger than a fifth threshold that is smaller than the fourth threshold, the shifting of the first line.

13. The working machine according to claim 10, wherein
the setting change unit is configured or programmed
to finish, when the derivative becomes not larger than a fifth threshold that is smaller than the fourth threshold, the shifting of the first line.

14. The working machine according to claim 11, wherein
the setting change unit is configured or programmed
to finish, when the derivative becomes not larger than a fifth threshold that is smaller than the fourth threshold, the shifting of the first line.

15. A working machine comprising:
a prime mover;
a traveling pump configured to be driven by power of the prime mover so as to deliver hydraulic fluid;
a traveling motor configured to be rotated by the hydraulic fluid delivered from the traveling pump;
an operation valve configured to change a pilot pressure of pilot fluid output therefrom to the traveling pump according to operation of an operation member;
an actuation valve configured to be activated according to a control signal so as to change a primary pressure that is the pilot pressure of the pilot fluid to be supplied to the operation valve;
a controller configured and programmed to perform setting of the control signal to be output to the actuation valve;

a circulation fluid passage fluidly connecting the traveling pump to the traveling motor; and a pressure detection device configured to detect a traveling pressure that is a pressure of the hydraulic fluid in the circulation fluid passage, wherein the controller includes a setting change unit configured or programmed to change, based on the traveling pressure, the setting of the control signal to be output to the actuation valve.

16. The working machine according to claim 15, further comprising:

an accelerator operable to set a target rotation speed of the prime mover;

a rotation speed detection device configured to detect an actual rotation speed of the prime mover; and a storage unit configured or programmed to store a first line that represents the control signal to be set based to the actual rotation speed when a difference between the target rotation speed and the actual rotation speed is not smaller than a first threshold, and to store a second line that represents the control signal larger than that represented by the first line when the difference between the target rotation speed and the actual rotation speed is smaller than the first threshold, wherein the setting change unit is configured or programmed to change, based on the traveling pressure, the control signal represented by the first line so as to shift the first line.

17. The working machine according to claim 16, wherein the actuation valve is a proportional solenoid valve having an opening degree increased in proportion to increase of an electric current value, and the setting change unit is configured or programmed to shift, when the traveling pressure becomes not smaller than a sixth threshold, the first line in a direction such as to increase the primary pressure output from the actuation valve.

18. The working machine according to claim 16, wherein the actuation valve is a proportional solenoid valve having an opening degree increased in proportion to increase of an electric current value, and the setting change unit is configured or programmed to shift, when the traveling pressure becomes not smaller than a sixth threshold, the first line in a direction such as to reduce the primary pressure output from the actuation valve.

19. The working machine according to claim 17, wherein the setting change unit is configured or programmed to finish, when the traveling pressure becomes not larger than a seventh threshold that is smaller than the sixth threshold, the shifting of the first line.

20. The working machine according to claim 18, wherein the setting change unit is configured or programmed to finish, when the traveling pressure becomes not larger than a seventh threshold that is smaller than the sixth threshold, the shifting of the first line.

* * * * *